(12) United States Patent
Black et al.

(10) Patent No.: US 8,743,909 B2
(45) Date of Patent: Jun. 3, 2014

(54) FRAME TERMINATION

(75) Inventors: Peter John Black, San Diego, CA (US); Rashid Ahmed Akbar Attar, San Diego, CA (US); Yu-Cheun Jou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 12/389,211

(22) Filed: Feb. 19, 2009

(65) Prior Publication Data

US 2009/0232052 A1    Sep. 17, 2009

Related U.S. Application Data

(60) Provisional application No. 61/030,215, filed on Feb. 20, 2008, provisional application No. 61/060,119, filed on Jun. 9, 2008, provisional application No. 61/060,408, filed on Jun. 10, 2008, provisional application No. 61/061,546, filed on Jun. 13, 2008.

(51) Int. Cl.
   *H04J 3/18*         (2006.01)
(52) U.S. Cl.
   USPC ............................................ 370/477; 714/748
(58) Field of Classification Search
   None
   See application file for complete search history.

(56) References Cited

U.S. PATENT DOCUMENTS 4,718,066 A    1/1988  Rogard
(Continued)

FOREIGN PATENT DOCUMENTS

CN    1394407 A    1/2003
CN    1447549 A    10/2003
(Continued)

OTHER PUBLICATIONS

International Search Report—PCT/US2010/049702—ISA/EPO—Mar. 17, 2011.

(Continued)

*Primary Examiner* — Jeffrey M Rutkowski
(74) *Attorney, Agent, or Firm* — Jeffrey D. Jacobs

(57) ABSTRACT

Techniques to increase capacity in a wireless communications system. In an aspect, systematic non-transmission, or "blanking," of minimal-rate frames transmitted in a communications system is provided. In an exemplary embodiment, eighth rate frames in a cdma2000 voice communications system are systematically substituted with null-rate frames carrying zero traffic bits. Provisions are nevertheless made for the transmission of certain designated as "critical" by, e.g., a vocoder. The receiver detects the presence of null rate or non-null rate transmissions and processes the received frames accordingly, including updating an outer loop power control only in response to non-null rate frames. Further techniques for changing the pilot transmission gating pattern to assist the receiver in detecting null rate frames are provided. In another aspect, early termination of a signal transmission over a wireless communications link is provided. In an exemplary embodiment, a base station (BS) transmits power control groups (PCG's) for a frame over a forward link (FL) to a mobile station (MS) until accurate reception of the frame is acknowledged by the MS over a reverse link (RL), possibly before all PCG's of the frame are received over the FL. Possible ACK signaling methods are defined for channels associated with a cdma2000 wireless communications system. In another exemplary embodiment, techniques for reverse link early termination are also provided.

36 Claims, 26 Drawing Sheets

P = PILOT
T = TRAFFIC

(56) References Cited

U.S. PATENT DOCUMENTS

| | | | |
|---|---|---|---|
| 4,885,744 A | 12/1989 | Lespagnol et al. | |
| 5,710,784 A | 1/1998 | Kindred et al. | |
| 5,751,725 A | 5/1998 | Chen | |
| 5,774,450 A | 6/1998 | Harada et al. | |
| 5,774,496 A | 6/1998 | Butler et al. | |
| 5,960,361 A | 9/1999 | Chen | |
| 5,983,383 A | 11/1999 | Wolf | |
| 6,108,373 A | 8/2000 | Fargues et al. | |
| 6,169,759 B1* | 1/2001 | Kanterakis et al. | 370/342 |
| 6,282,233 B1 | 8/2001 | Yoshida | |
| 6,285,682 B1 | 9/2001 | Proctor et al. | |
| 6,396,867 B1* | 5/2002 | Tiedemann et al. | 370/342 |
| 6,532,254 B1 | 3/2003 | Jokinen | |
| 6,545,989 B1 | 4/2003 | Butler | |
| 6,553,224 B1 | 4/2003 | Kim | |
| 6,633,601 B1 | 10/2003 | Yang | |
| 6,741,661 B2 | 5/2004 | Wheatley, III et al. | |
| 6,747,963 B1 | 6/2004 | Park et al. | |
| 6,765,531 B2 | 7/2004 | Anderson | |
| 6,771,934 B2 | 8/2004 | Demers et al. | |
| 6,917,607 B1 | 7/2005 | Yeom et al. | |
| 6,956,893 B2 | 10/2005 | Frank et al. | |
| 6,975,604 B1 | 12/2005 | Ishida et al. | |
| 6,977,888 B1 | 12/2005 | Frenger et al. | |
| 6,983,166 B2 | 1/2006 | Shiu et al. | |
| 7,006,439 B2 | 2/2006 | Thron et al. | |
| 7,006,795 B2 | 2/2006 | Foschini et al. | |
| 7,031,742 B2 | 4/2006 | Chen et al. | |
| 7,042,869 B1 | 5/2006 | Bender | |
| 7,123,590 B2 | 10/2006 | Mir et al. | |
| 7,130,365 B2 | 10/2006 | Li | |
| 7,167,502 B1 | 1/2007 | Tsaur | |
| 7,224,962 B1 | 5/2007 | Kite | |
| 7,302,009 B2 | 11/2007 | Walton et al. | |
| 7,349,379 B2 | 3/2008 | Schmidl et al. | |
| 7,406,065 B2 | 7/2008 | Willenegger et al. | |
| 7,466,666 B2 | 12/2008 | Yoon et al. | |
| 7,724,701 B2 | 5/2010 | Lundby et al. | |
| 8,442,441 B2 | 5/2013 | Pfister et al. | |
| 2001/0018650 A1 | 8/2001 | DeJaco | |
| 2001/0021229 A1 | 9/2001 | Belaiche | |
| 2002/0006138 A1 | 1/2002 | Odenwalder | |
| 2002/0046379 A1* | 4/2002 | Miki et al. | 714/749 |
| 2002/0071407 A1* | 6/2002 | Koo et al. | 370/342 |
| 2002/0093937 A1 | 7/2002 | Kim et al. | |
| 2002/0131381 A1* | 9/2002 | Kim et al. | 370/342 |
| 2002/0131532 A1 | 9/2002 | Chi et al. | |
| 2003/0003906 A1 | 1/2003 | Demers et al. | |
| 2003/0004784 A1 | 1/2003 | Li et al. | |
| 2003/0041206 A1 | 2/2003 | Dickie | |
| 2003/0103470 A1 | 6/2003 | Yafuso | |
| 2003/0125037 A1 | 7/2003 | Bae et al. | |
| 2003/0134656 A1 | 7/2003 | Chang et al. | |
| 2003/0199290 A1 | 10/2003 | Viertola | |
| 2003/0212816 A1 | 11/2003 | Bender et al. | |
| 2003/0223396 A1 | 12/2003 | Tsai et al. | |
| 2004/0005897 A1 | 1/2004 | Tomoe et al. | |
| 2004/0081124 A1* | 4/2004 | Black et al. | 370/342 |
| 2004/0081195 A1 | 4/2004 | El-Maleh et al. | |
| 2004/0082356 A1 | 4/2004 | Walton et al. | |
| 2004/0085917 A1 | 5/2004 | Fitton et al. | |
| 2004/0085936 A1* | 5/2004 | Gopalakrishnan et al. | 370/342 |
| 2004/0131007 A1 | 7/2004 | Smee et al. | |
| 2004/0141525 A1 | 7/2004 | Bhushan et al. | |
| 2004/0157614 A1 | 8/2004 | Fujita et al. | |
| 2004/0160933 A1* | 8/2004 | Odenwalder et al. | 370/342 |
| 2004/0198404 A1* | 10/2004 | Attar et al. | 370/342 |
| 2004/0223507 A1* | 11/2004 | Kuchibhotla et al. | 714/748 |
| 2004/0229615 A1 | 11/2004 | Agrawal | |
| 2004/0240400 A1 | 12/2004 | Khan | |
| 2004/0240416 A1 | 12/2004 | Derryberry et al. | |
| 2005/0013263 A1 | 1/2005 | Kim et al. | |
| 2005/0018614 A1 | 1/2005 | Kiran | |
| 2005/0037718 A1 | 2/2005 | Kim et al. | |
| 2005/0053088 A1 | 3/2005 | Cheng et al. | |
| 2005/0058154 A1 | 3/2005 | Lee et al. | |
| 2005/0185364 A1 | 8/2005 | Bell et al. | |
| 2005/0249163 A1 | 11/2005 | Kim et al. | |
| 2005/0265399 A1 | 12/2005 | El-Maleh et al. | |
| 2006/0050666 A1 | 3/2006 | Odenwalder | |
| 2006/0126844 A1 | 6/2006 | Mauro | |
| 2006/0141933 A1 | 6/2006 | Smee et al. | |
| 2006/0142038 A1 | 6/2006 | Ozarow et al. | |
| 2006/0209783 A1 | 9/2006 | Jain et al. | |
| 2006/0209902 A1 | 9/2006 | Grilli et al. | |
| 2007/0021148 A1 | 1/2007 | Mahini | |
| 2007/0040704 A1 | 2/2007 | Smee et al. | |
| 2007/0050189 A1 | 3/2007 | Cruz-Zeno et al. | |
| 2007/0086513 A1 | 4/2007 | Fernandez-Corbaton et al. | |
| 2007/0110095 A1 | 5/2007 | Attar et al. | |
| 2007/0112564 A1 | 5/2007 | Jelinek | |
| 2007/0133423 A1 | 6/2007 | Okumura | |
| 2007/0133475 A1 | 6/2007 | Peisa et al. | |
| 2007/0150787 A1* | 6/2007 | Kim et al. | 714/748 |
| 2008/0019308 A1 | 1/2008 | Chuan-Lin et al. | |
| 2008/0080363 A1 | 4/2008 | Black et al. | |
| 2008/0080406 A1 | 4/2008 | Peplinski et al. | |
| 2008/0101440 A1 | 5/2008 | Lee | |
| 2009/0022098 A1 | 1/2009 | Novak et al. | |
| 2009/0109907 A1 | 4/2009 | Tsai et al. | |
| 2009/0252201 A1 | 10/2009 | Smee et al. | |
| 2009/0303968 A1 | 12/2009 | Jou et al. | |
| 2009/0303976 A1 | 12/2009 | Jou et al. | |
| 2009/0304024 A1 | 12/2009 | Jou et al. | |
| 2010/0061496 A1 | 3/2010 | Black et al. | |
| 2010/0097955 A1 | 4/2010 | Jou | |
| 2010/0142479 A1 | 6/2010 | Black et al. | |
| 2011/0264976 A1* | 10/2011 | Yang et al. | 714/748 |
| 2012/0243515 A1 | 9/2012 | Xue et al. | |
| 2012/0281675 A1 | 11/2012 | Liang et al. | |

FOREIGN PATENT DOCUMENTS

| | | |
|---|---|---|
| CN | 1552133 A | 12/2004 |
| CN | 1726657 A | 1/2006 |
| CN | 1758563 A | 4/2006 |
| CN | 1891002 A | 1/2007 |
| CN | 1983913 A | 6/2007 |
| CN | 101465689 A | 6/2009 |
| CN | 101483499 A | 7/2009 |
| EP | 1168703 A2 | 1/2002 |
| EP | 1199833 A2 | 4/2002 |
| EP | 1398984 A1 | 3/2004 |
| EP | 1643737 A1 | 4/2006 |
| EP | 1677433 A1 | 7/2006 |
| EP | 1701565 A1 | 9/2006 |
| EP | 1703659 A2 | 9/2006 |
| EP | 1821497 A1 | 8/2007 |
| GB | 2337417 | 11/1999 |
| JP | 62239735 A | 10/1987 |
| JP | 10500811 | 1/1998 |
| JP | H10327126 A | 12/1998 |
| JP | 2001036964 A | 2/2001 |
| JP | 2001078252 | 3/2001 |
| JP | 2001511963 A | 8/2001 |
| JP | 2001519113 | 10/2001 |
| JP | 2002009741 A | 1/2002 |
| JP | 2002506583 | 2/2002 |
| JP | 2002532008 T | 9/2002 |
| JP | 2002353824 | 12/2002 |
| JP | 2003518344 A | 6/2003 |
| JP | 2004502323 | 1/2004 |
| JP | 2004512733 A | 4/2004 |
| JP | 2004194288 A | 7/2004 |
| JP | 2004531975 | 10/2004 |
| JP | 2004343754 A | 12/2004 |
| JP | 2005517343 | 6/2005 |
| JP | 2006501707 | 1/2006 |
| JP | 2006180266 A | 7/2006 |
| JP | 2006191582 A | 7/2006 |

(56) References Cited

FOREIGN PATENT DOCUMENTS

| | | |
|---|---|---|
| JP | 2006314086 A | 11/2006 |
| JP | 2007503169 A | 2/2007 |
| JP | 2007524269 A | 8/2007 |
| JP | 2008053889 A | 3/2008 |
| JP | 2008526136 A | 7/2008 |
| JP | 2008199493 A | 8/2008 |
| JP | 2008539664 A | 11/2008 |
| JP | 2009504097 A | 1/2009 |
| JP | 4643656 | 12/2010 |
| JP | 2005538650 | 12/2010 |
| KR | 20000052668 A | 8/2000 |
| KR | 20000071672 A | 11/2000 |
| KR | 20020092136 | 12/2002 |
| KR | 20030059528 A | 7/2003 |
| KR | 20040097893 A | 11/2004 |
| KR | 20040108813 | 12/2004 |
| KR | 20050073113 A | 7/2005 |
| KR | 20070091214 A | 9/2007 |
| KR | 20070104633 A | 10/2007 |
| KR | 20080031502 A | 4/2008 |
| KR | 20080039772 A | 5/2008 |
| RU | 2233045 C2 | 7/2004 |
| RU | 2323529 C2 | 4/2008 |
| WO | WO9526593 A2 | 10/1995 |
| WO | 9832231 A1 | 7/1998 |
| WO | WO9857452 A1 | 12/1998 |
| WO | 9923844 | 5/1999 |
| WO | WO9929048 | 6/1999 |
| WO | WO0033528 A1 | 6/2000 |
| WO | WO0035126 | 6/2000 |
| WO | WO0062456 | 10/2000 |
| WO | WO0223792 A1 | 3/2002 |
| WO | 0233877 A1 | 4/2002 |
| WO | WO02103920 A2 | 12/2002 |
| WO | 03001834 A1 | 1/2003 |
| WO | WO-03021905 A1 | 3/2003 |
| WO | WO 03/105370 * | 12/2003 |
| WO | WO2004025986 A2 | 3/2004 |
| WO | WO2004114582 A1 | 12/2004 |
| WO | WO-2005020464 A1 | 3/2005 |
| WO | 2006072088 A1 | 7/2006 |
| WO | WO2006071761 A1 | 7/2006 |
| WO | WO-2006115979 A1 | 11/2006 |
| WO | WO2007016553 A1 | 2/2007 |
| WO | 2008027192 A2 | 3/2008 |
| WO | WO2008156061 A1 | 12/2008 |

OTHER PUBLICATIONS

International Search Report & Written Opinion—PCT/US2009/046708, International Search Authority—European Patent Office—Oct. 14, 2009.

International Search Report & Written Opinion—PCT/US2009/046717, International Search Authority—European Patent Office—Oct. 7, 2009.

International Search Report & Written Opinion—PCT/US2009/046720, International Search Authority—European Patent Office—Nov. 27, 2009.

International Search Report and Written Opinion—PCT/US2006/032937, International Search Authority—European Patent Office—Feb. 23, 2007.

International Search Report and Written Opinion—PCT/US2009/034637, International Search Authority—European Patent Office—Jul. 14, 2009.

International Search Report and Written Opinion—PCT/US2009/060383, International Search Authority—European Patent Office—Mar. 29, 2010.

International Search Report and Written Opinion—PCT/US2010/049690, ISA/EPO—May 6, 2011.

International Search Report and Written Opinion—PCT/US2010/038720, International Search Authority—European Patent Office—Sep. 10, 2010.

Partial International Search Report and Written Opinion—PCT/US2010/049690, International Search Authority—European Patent Office—Mar. 11, 2011.

Taiwanese Search report—095130863—TIPO—Jul. 6, 2010.

3rd Generation Partnership, Project 2 "3GPP2" Physical Layer Standard for cdma2000,Spread Spectrum Systems. Revision D, 3GPP2 C.S0002-D, Version 2.0, Sep. 30, 2005 (538 pages).

Chen, B.Y., et al., "Using H.264 Coded Block Patterns for Fast Inter-Mode Selection" MULTIMEDIA AND EXPO, 2008 IEEE International Conference on, IEEE, Piscataway, NJ, USA, Jun. 23, 2008, pp. 721-724, XP031312823 ISBN: 978-1-4244-2570-9.

JVT: "Draft ITU-T Recommendation and Final Draft International Standard of Joint Video Specification (ITU-T Rec. H .264 ISO/IEC 14496- 10 AVC)", 7. JVT Meeting; 64. MPEG Meeting; Mar. 7-14, 2003; Pattaya,TH; (JointVideo Team of ISO/IEC JTC1/SC29/WG11 and ITU-T 56.16 ), No. JVT-G050r1, Mar. 14, 2003, XP030005712, ISSN: 0000-0427.

Taiwan Search Report—TW098105489—TIPO—Dec. 21, 2012.

European Search Report—EP13179791—Search Authority—The Hague—Sep. 26, 2013.

NTT DoCoMo: "Text proposals for detailed channel coding," 3GPP TSG-RAN WG1#7, R1-99b49, Aug. 1999, pp. 24.

* cited by examiner

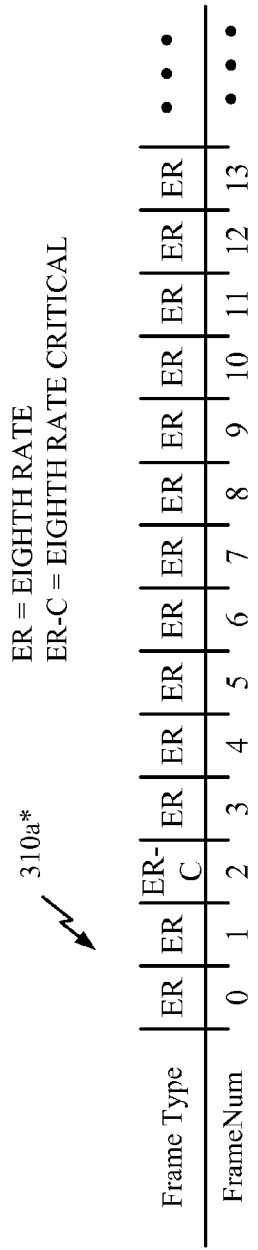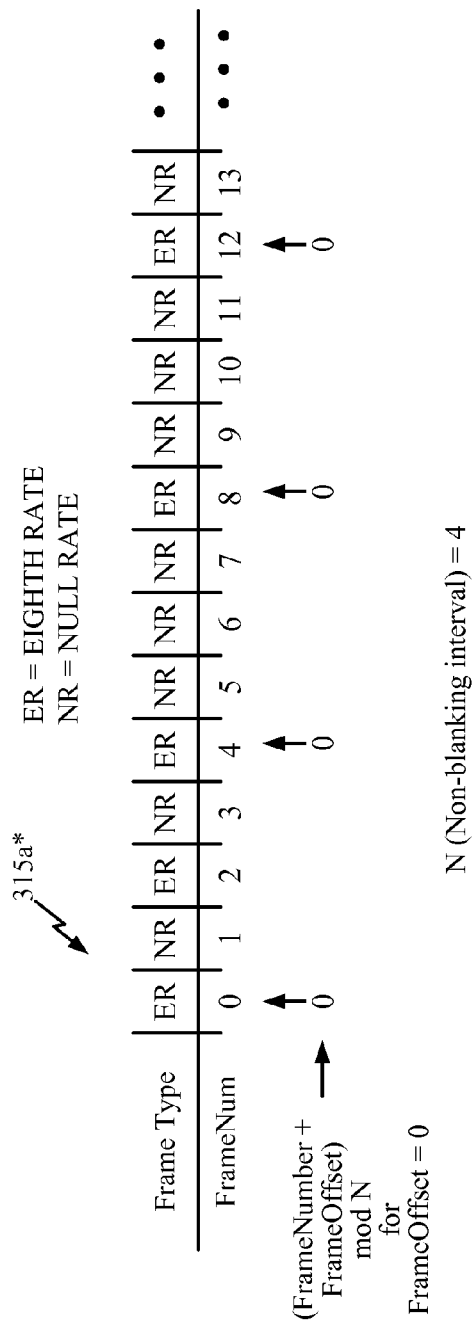

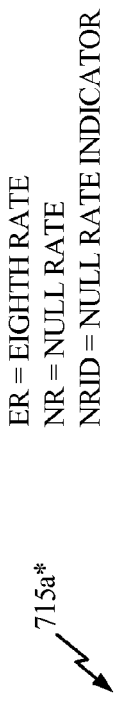
FIG 9
FIG 9A

FRAME TERMINATION

RELATED APPLICATIONS

CLAIM OF PRIORITY

This application claims priority to U.S. Provisional Application Ser. No. 61/060,119, entitled "Apparatus and Methods for Increasing Capacity in Wireless Communications," filed Jun. 9, 2008, and U.S. Provisional Application Ser. No. 61/060,408, entitled "Apparatus and Methods for Increasing Capacity in Wireless Communications," filed Jun. 10, 2008, and U.S. Provisional Application Ser. No. 61/061,546, entitled "Apparatus and Methods for Increasing Capacity in Wireless Communications," filed Jun. 13, 2008, and U.S. Provisional Application Ser. No. 61/030,215, entitled "Frame Termination", filed Feb. 20, 2008, the contents of which are hereby incorporated by reference in their entirety.

This application is related to U.S. patent application Ser. No. 12/252,544, entitled "Rate Determination," filed Oct. 16, 2008, assigned to the assignee of the present application, the contents of which are hereby incorporated by reference in their entirety.

TECHNICAL FIELD

The present invention relates generally to digital communications, and more specifically, to techniques for reducing transmission power and improving the capacity of wireless digital communications systems.

BACKGROUND

Wireless communications systems are widely deployed to provide various types of communication such as voice, packet data, and so on. These systems may be based on code division multiple access (CDMA), time division multiple access (TDMA), frequency division multiple access (FDMA), or other multiple access techniques. For example, such systems can conform to standards such as Third-Generation Partnership Project 2 (3gpp2, or "cdma2000"), Third-Generation Partnership (3gpp, or "W-CDMA"), or Long Term Evolution ("LTE"). In the design of such communications systems, it is desirable to maximize the capacity, or the number of users the system can reliably support, given the available resources. Several factors impact the capacity of a wireless communications system, some of which are described below.

For example, in a voice communications system, a vocoder is often employed to encode a voice transmission using one of a plurality of variable encoding rates. The encoding rate may be selected based on, e.g., the amount of speech activity detected during a particular time interval. In a vocoder for a cdma2000 wireless communication system, for example, speech transmissions may be sent using full rate (FR), half rate (HR), quarter rate (QR), or eighth rate (ER) frames, with a full rate frame containing the greatest number of traffic bits, and an eighth rate frame containing the least number of traffic bits. An eighth rate frame is usually sent during periods of silence, and generally corresponds to the lowest-rate transmission that may be achieved by the voice communications system.

While an eighth rate frame represents a reduced-rate transmission in a cdma2000 system, the eighth rate frame still contains a non-zero number of traffic bits. During certain intervals, e.g., relatively long periods wherein there is no speech activity and background noise remains constant, even the eighth rate frame transmissions may unnecessarily consume a significant level of transmission power in the system. This may raise the level of interference caused to other users, thereby undesirably decreasing system capacity.

It would be desirable to provide techniques to further decrease the transmission rate of a voice communications system below what minimum-rate frame transmissions such as eighth rate frame transmissions can provide. It would be further desirable to provide modified power control schemes to accommodate such techniques.

In another aspect of a wireless communications system, transmissions between two units often employ a degree of redundancy to guard against errors in the received signals. For example, in a forward link (FL) transmission from a base station (BS) to a mobile station (MS) in a cdma2000 wireless communications system, redundancies such as fractional-rate symbol encoding and symbol repetition may be employed. In a cdma2000 system, encoded symbols are grouped into sub-segments known as power control groups (PCG's) and transmitted over the air, with a fixed number of PCG's defining a frame.

While symbol redundancy techniques such as those employed in cdma2000 may allow accurate recovery of transmitted signals in the presence of errors, such techniques also represent a premium in the overall system transmission power when signal reception conditions are good, which may also undesirably decrease the system capacity.

It would be further desirable to provide efficient techniques to, for example, terminate transmission of a frame when it is determined that the receiver has accurately recovered the information associated with that frame, thereby saving transmission power and increasing the system capacity.

BRIEF DESCRIPTION OF DRAWINGS

FIGS. 5 and 5A illustrate exemplary frame transmission sequences as processed by a vocoder and a systematic blanking module.

FIGS. 9 and 9A illustrate exemplary frame transmission sequences as processed by a vocoder and a systematic blanking module.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Figure 1:
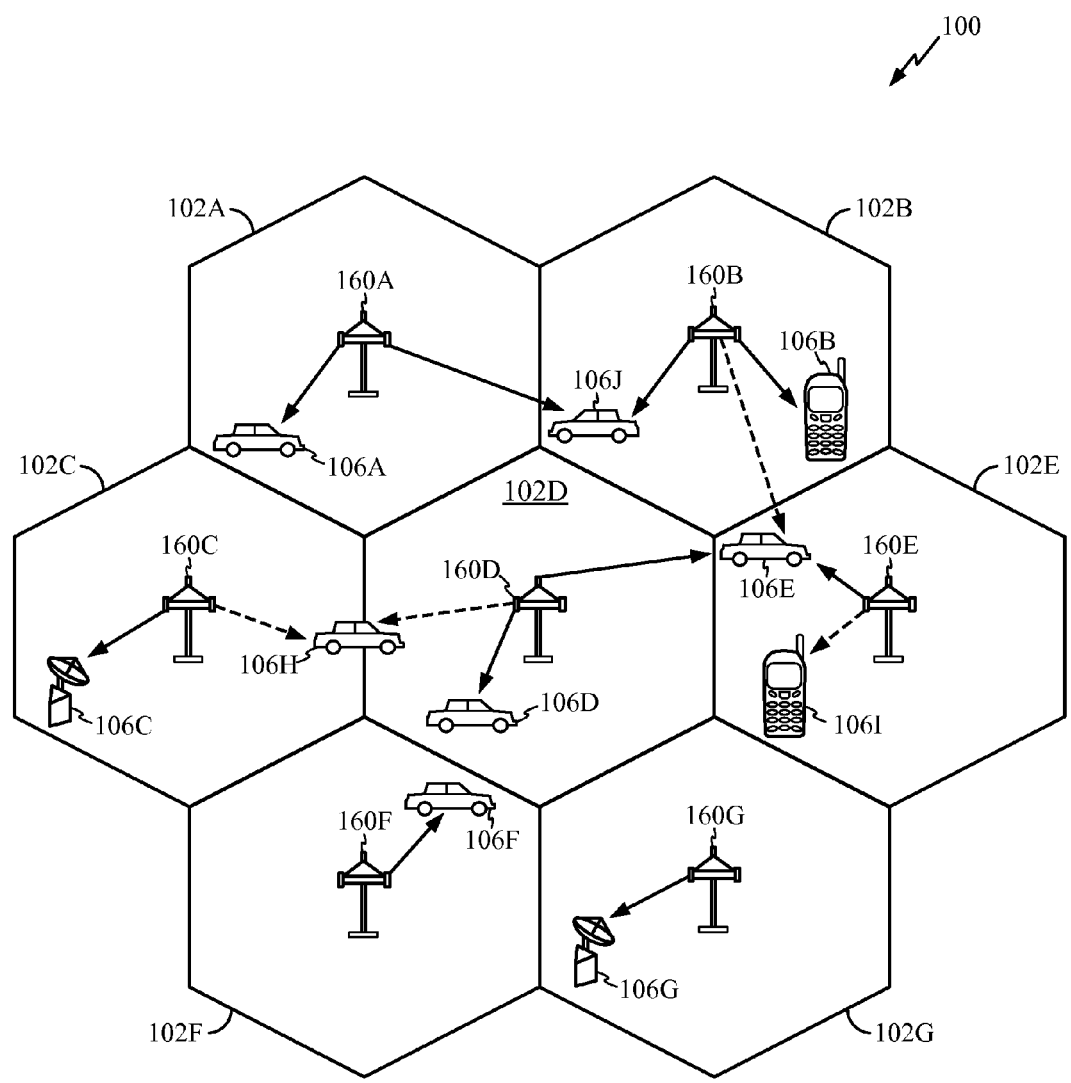
FIG. 1 illustrates a prior art wireless communications system.

Communications systems may use a single carrier frequency or multiple carrier frequencies. Referring to FIG. 1, in a wireless cellular communications system 100, reference numerals 102A to 102G refer to cells, reference numerals 160A to 160G refer to base stations, and reference numerals 106A to 106G refer to access terminals (AT's). A communications channel includes a forward link (FL) (also known as a downlink) for transmissions from the access network (AN) 160 to the access terminal (AT) 106 and a reverse link (RL) (also known as an uplink) for transmissions from the AT 106 to the AN 160. The AT 106 is also known as a remote station, a mobile station or a subscriber station. The access terminal (AT) 106 may be mobile or stationary. Each link may incorporate a different number of carrier frequencies. Furthermore, an access terminal 106 may be any data device that communicates through a wireless channel or through a wired channel, for example using fiber optic or coaxial cables. An access terminal 106 may further be any of a number of types of devices including but not limited to PC card, compact flash, external or internal modem, or wireless or wireline phone.

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communications link. The channel allocations can take on various forms depending on the specific multi-access technique. By way of example, in FDMA systems, the total frequency spectrum is divided into a number of smaller sub-bands and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a code.

While certain exemplary embodiments of the present disclosure may be described hereinbelow for operation according to the cdma2000 standard, one of ordinary skill in the art will appreciate that the techniques may readily be applied to other digital communications systems. For example, the techniques of the present disclosure may also be applied to systems based on the W-CDMA (or 3gpp) wireless communications standard, and/or any other communications standards. Such alternative exemplary embodiments are contemplated to be within the scope of the present disclosure.

Figure 2:
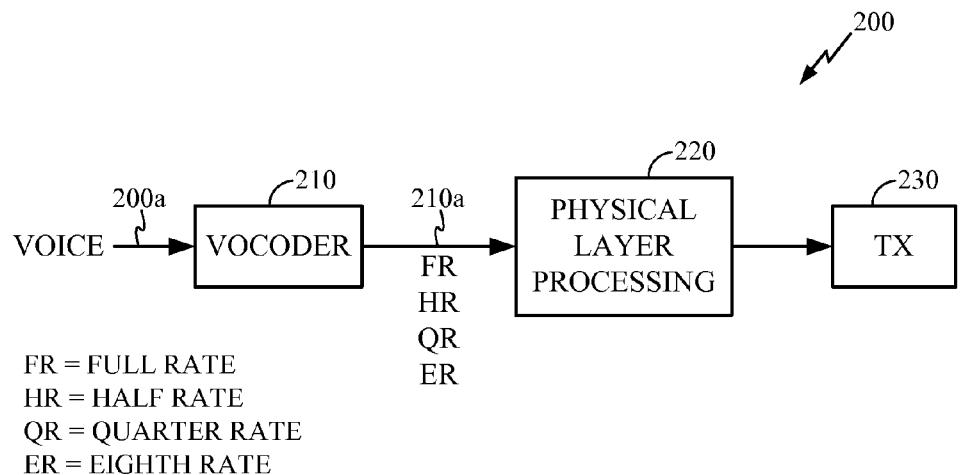
FIG. 2 illustrates a prior art signal transmission path for voice.

FIG. 2 illustrates a prior art signal transmission path 200 for voice. In FIG. 2, a voice signal 200a is input to a vocoder 210, which codes the speech signal for transmission. A voice frame 210a output by the vocoder 210 may take on one of a plurality of rates, depending on the speech content of the voice signal 200a at any time. In FIG. 2, the plurality of rates includes a full rate (FR), half rate (HR), quarter rate (QR), and eighth rate (ER). The voice frame 210a is provided to a physical layer processing module 220, which prepares the voice frame data for transmission according to the physical layer protocols of the system. One of ordinary skill in the art will appreciate that such protocols may include, e.g., encoding, repeating, puncturing, interleaving, and/or modulating the data. The output of the physical layer processing module 220 is provided to the TX block 230 for transmission. The TX block 230 may perform radio-frequency (RF) operations such as upconverting the signal to a carrier frequency and amplifying the signal for transmission over an antenna (not shown).

In general, the rate of the voice frame 210a selected by the vocoder 210 to encode the voice signal 200a at any time may depend on the level of speech activity detected in the voice signal 200a. For example, a full rate (FR) may be selected for frames during which the voice signal 200a contains active speech, while an eighth rate (ER) may be selected for frames during which the voice signal 200a contains silence. During such periods of silence, an ER frame may contain parameters characterizing the "background noise" associated with the silence. While an ER frame contains significantly fewer bits than an FR frame, silence periods may occur quite often during a normal conversation, thereby causing the overall transmission bandwidth devoted to transmitting ER frames to be significant.

It would be desirable to further reduce the transmission bandwidth required to convey the voice signal 200a to a receiver.

Figure 3:
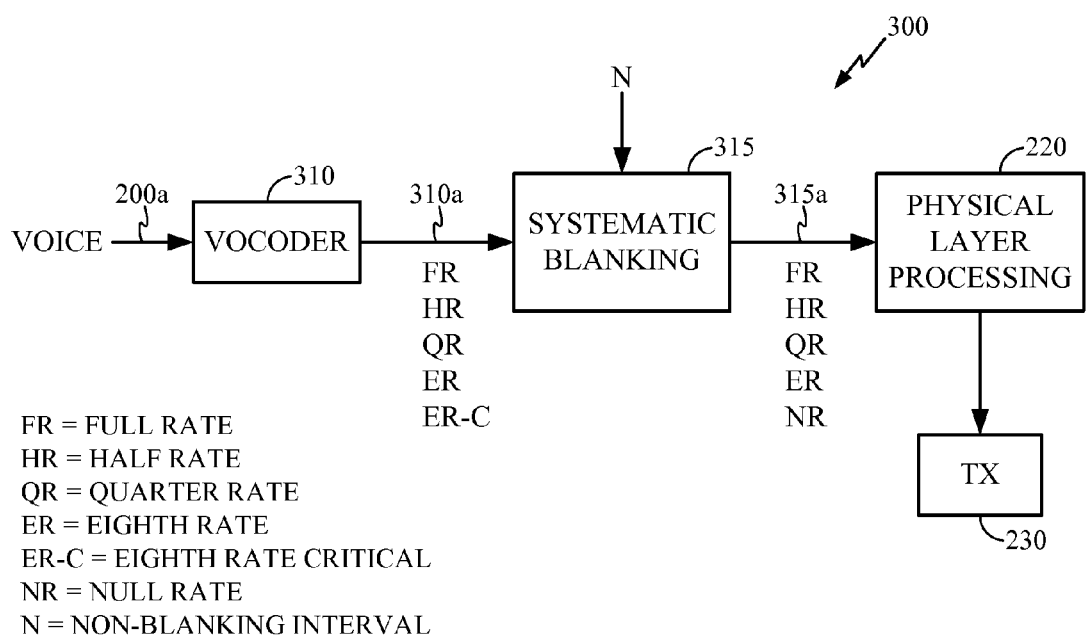
FIG. 3 illustrates an exemplary embodiment of a signal transmission path for voice according to the present disclosure.

FIG. 3 illustrates an exemplary embodiment of a signal transmission path 300 for voice according to the present disclosure. In FIG. 3, a voice signal 200a is input to a vocoder 310, which generates a voice frame 310a for transmission. The voice frame 310a may take on one of a plurality of rates including a full rate (FR), half rate (HR), quarter rate (QR), eighth rate (ER), and a critical eighth rate (ER-C). In an exemplary embodiment, the designation of an eighth-rate frame as a "critical" eighth rate frame may be made by the vocoder 310 for those eighth-rate frames containing parameters corresponding to, e.g., a change in the detected background noise in the silence interval.

The voice frame 310a is provided to a systematic blanking module 315, which in turn provides a processed voice frame 315a to the physical layer processing module 220. As further described hereinbelow, the systematic blanking module 315 is configured to minimize the transmission bitrate of the vocoder output 310a by selectively "blanking" the vocoder output, i.e., replacing certain frames of the vocoder output 310a with null rate (NR) frames having a data rate less than that of the eighth rate frame. In an exemplary embodiment, NR frames may have zero traffic content, i.e., a traffic bitrate of 0 bits per second (bps).

Figure 4:
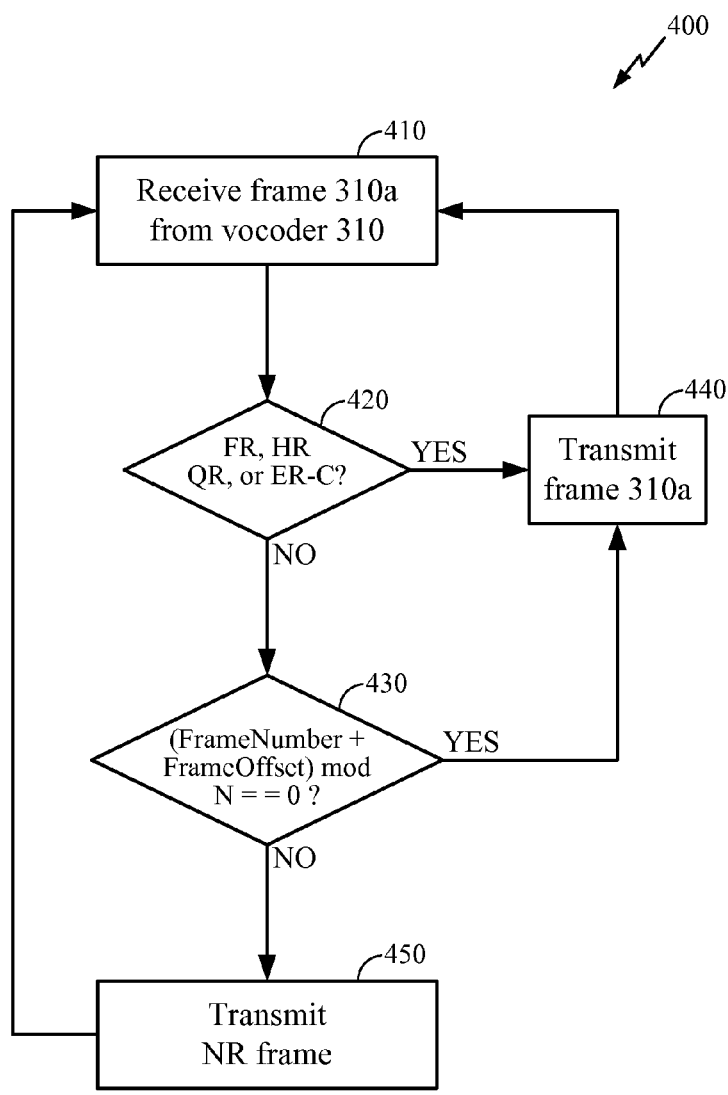
FIG. 4 illustrates an exemplary embodiment of an algorithm that may be applied by the systematic blanking module.

FIG. 4 illustrates an exemplary embodiment 400 of an algorithm that may be applied by the systematic blanking module 315.

At step 410, the systematic blanking module 315 receives a frame 310a from the vocoder 310.

At step 420, the frame 310a is evaluated to determine whether it is FR, HR, QR, or ER-C. Such rates are deemed critical for transmission. If the frame 310a contains one of these critical rates, then the frame 310a is directly provided to the physical layer processing module 220 for transmission. If not, the frame is deemed to contain a non-critical rate, and the algorithm proceeds to step 430.

Note the exemplary designation of FR, HR, QR, and ER-C as "critical" is for illustrative purposes only, and is not meant to restrict the scope of the present disclosure to only those embodiments wherein such frame types are designated as critical. In alternative exemplary embodiments, other sets of frame types may be designated critical for transmission by a systematic blanking module. Such alternative exemplary embodiments are contemplated to be within the scope of the present disclosure.

At step 430, the algorithm evaluates a frame number of the current frame to be transmitted to determine whether a guaranteed transmission is to be made. In an exemplary embodiment, a guaranteed transmission may include a non-zero rate transmission. In an exemplary embodiment, a frame number may be a number assigned to each frame that is continuously iterated for each successive frame. In the exemplary embodiment shown, the current frame number FrameNumber is added to the current frame offset FrameOffset, and the result (FrameNumber+FrameOffset) is applied to a modulo operation (mod) with a non-blanking interval parameter N. If the result of the modulo operation is 0, the algorithm proceeds to step 440. Otherwise, the algorithm proceeds to step 450.

One of ordinary skill in the art will appreciate that techniques other than the specific evaluation shown at step 430 may readily be applied to specify which frames are to be guaranteed for transmission. Such alternative techniques may utilize, e.g., parameters other than the current frame number or current frame offset, or operations other than the modulo operation depicted.

At step 450, the systematic blanking module 315 provides a null rate (NR) frame to the physical layer processing module 220 for transmission. In an exemplary embodiment, a null rate frame contains no traffic bits, and thus consumes minimal signaling bandwidth. After transmission of the null rate frame, the algorithm returns to step 410 to receive the next voice frame 310a from the vocoder 310.

Based on the above description, one of ordinary skill in the art will appreciate that the non-blanking interval N controls how often non-critical frames are transmitted, with N=1 corresponding to transmission of all non-critical frames, and greater values of N corresponding to less frequent transmissions of non-critical frames. In an exemplary embodiment, N may take on values of 1, 4 by default, 8, or other reserved values specified, e.g., by external signaling (not shown).

FIGS. 5 and 5A illustrate exemplary frame transmission sequences 310a* and 315a*, respectively, as processed by a vocoder 310 and a systematic blanking module 315.

In FIG. 5, the sequence of frames 310a* includes eighth-rate frames labeled "ER" and eighth-rate critical frames labeled "ER-C." Such a sequence of frames may arise during a voice conversation, e.g., a period of silence from one side of a conversation.

In FIG. 5A, the frame transmission sequence 315a* corresponds to the result of applying a selective blanking algorithm such as 400 to the transmission sequence 310a*, wherein a non-blanking interval N=4 is used. In FIG. 5A, the sequence of frames 315a* includes eighth-rate frames ER and null-rate frames NR. FrameNum 0 is transmitted directly as received from vocoder 310, i.e., as an ER frame. FrameNum's 1 and 3 are transmitted as NR frames in accordance with a non-blanking interval N=4. FrameNum 2, which is designated by the vocoder as a critical eighth-rate frame ER-C, is transmitted as an ER frame. FrameNum's 4 through 13 are similarly processed, as shown. Note in FIG. 5A, the frames corresponding to (FrameNum+FrameOffset mod N)=0 are marked.

Figure 6:
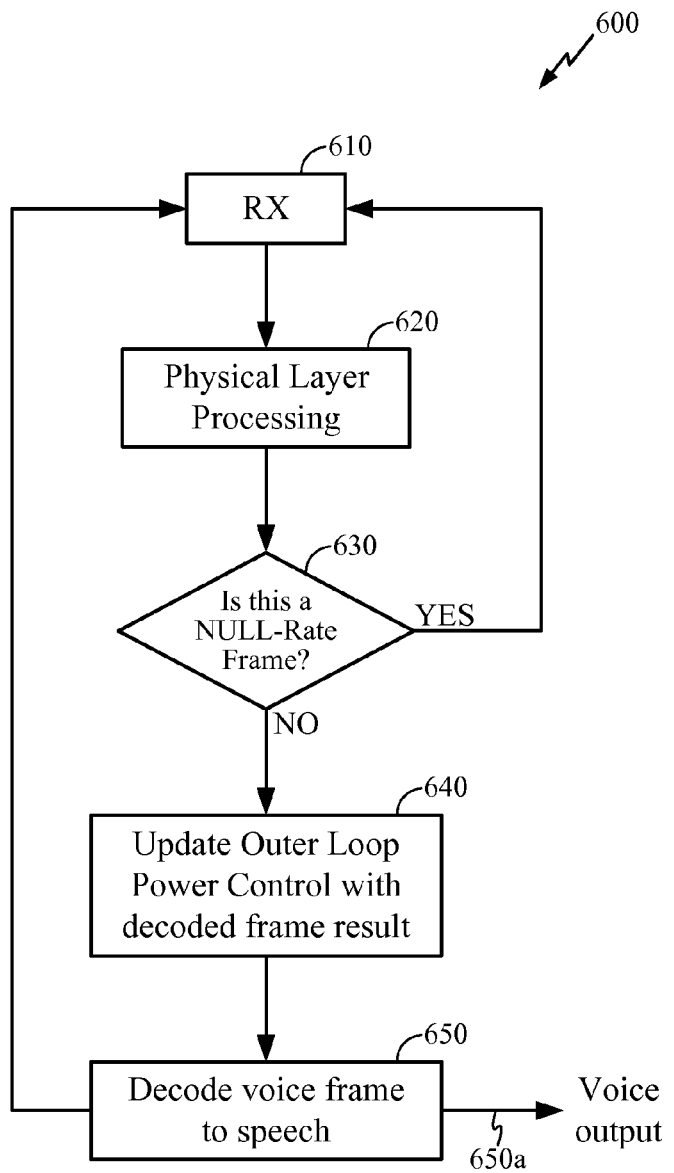
FIG. 6 illustrates an exemplary embodiment of a receiving algorithm for processing systematic-blanked signals generated by a voice signal transmission path such as shown in FIG. 3.

FIG. 6 illustrates an exemplary embodiment of a receiving algorithm 600 for processing signals generated by a voice transmission signal path employing a systematic blanking module such as 315 shown in FIG. 3.

In FIG. 6, at step 610, a transmitted signal is received (RX) and processed using, e.g., operations complementary to the TX operations 230 such as shown in FIG. 3. Such RX operations may include, e.g., RF amplification, frequency down-conversion, filtering, etc.

At step 620, physical layer receive (RX) processing is performed using, e.g., operations complementary to the physical layer TX operations 220 shown in FIG. 3. Such physical layer receive processing may include, e.g., decoding, deinterleaving, symbol combining, etc.

At step 630, the algorithm 600 evaluates whether the current received frame is an NR frame. If yes, the algorithm returns to step 610 to begin receiving the next frame, as there is no traffic data to be processed for the NR frame. If no, the algorithm proceeds to step 640.

One of ordinary skill in the art will appreciate that various techniques may be employed to evaluate whether the current received frame is an NR frame. In an exemplary embodiment, an energy evaluation algorithm may be employed to detect the energy in the traffic portion of the received frame. For example, the energy corresponding to the traffic portion of a received frame may be measured, and compared to an appropriate scaled energy threshold. If the measured energy is less than the threshold, then a NR frame may be declared, since, in an exemplary embodiment, no signal is expected to be transmitted by the transmitter in the traffic portion of the NR frame. Such energy evaluation algorithms may also utilize knowledge of the systematic blanking algorithm and non-blanking interval N used by the transmitter to further assist in the detection of NR frames.

Note the preceding description of possible NR detection algorithms is given for illustrative purposes only, and is not meant to limit the scope of the present disclosure to any particular NR detection algorithms.

At step 640, a parameter of the received non-NR frame may be used to update an outer loop power control (OLPC) algorithm at the receiver. In an exemplary embodiment, a parameter of the received non-NR frame may include, e.g., the result of whether a frame quality indicator (FQI), such as a CRC for the received frame, has passed a quality check. One of ordinary skill in the art will appreciate that an OLPC algorithm may be used to, e.g., compute an appropriate signal-to-interference ratio (SIR) setpoint for received frames, which may be used to guide a power control feedback mechanism between the transmitter and receiver for the transmitted voice frames. By excluding quality check results derived from NR frames, the OLPC algorithm may be correctly updated using, e.g., only frames having significant transmitted energy for the traffic portion.

At step 650, the voice frame may be decoded to a voice output 650a, and the algorithm 600 returns to step 610 to receive the next frame.

Figure 7:
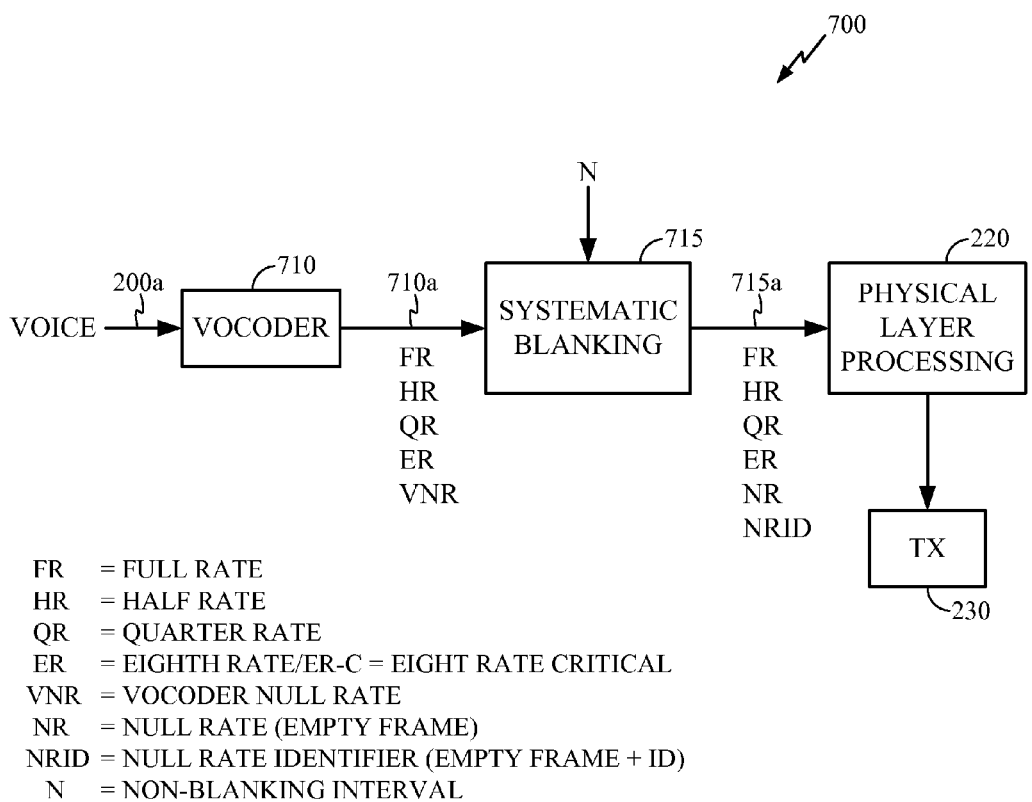
FIG. 7 illustrates an alternative exemplary embodiment of a signal transmission path for voice according to the present disclosure.

FIG. 7 illustrates an alternative exemplary embodiment of a signal transmission path 700 for voice according to the present disclosure. In FIG. 7, a voice signal 200a is input to a vocoder 710, which generates a voice frame 710a for transmission. The voice frame 710a may take on one of a plurality of rates including a full rate (FR), half rate (HR), quarter rate (QR), eighth rate (ER), and a vocoder null rate (VNR). A VNR frame, also known as a zero-rate vocoder frame or empty vocoder frame, is generated by the vocoder 710 when there is no new information to be sent by the vocoder. In an exemplary embodiment, the VNR frame may simply be a blank frame containing no data.

The voice frame 710a is provided to a systematic blanking module 715, which in turn provides a processed voice frame 715a to the physical layer processing module 220. As further described hereinbelow, the systematic blanking module 715 is configured to minimize the transmission bitrate of the vocoder output 710a by selectively replacing certain frames of the vocoder output 710a with null rate (NR) or null-rate indicator (NRID) frames having little or no data content.

Figure 8:
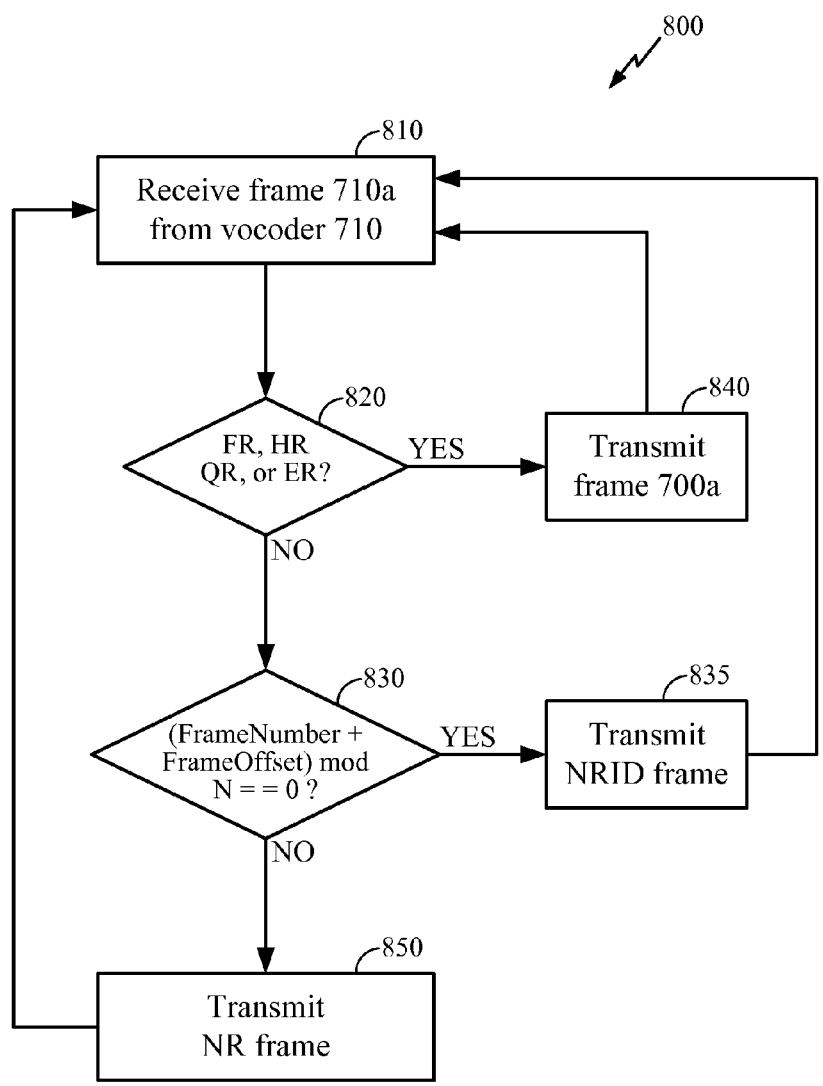
FIG. 8 illustrates an exemplary embodiment of an algorithm that may be applied by the systematic blanking module.

FIG. 8 illustrates an exemplary embodiment 800 of an algorithm that may be applied by the systematic blanking module 715.

At step 810, the systematic blanking module 715 receives a frame 710a from the vocoder 710.

At step 820, the frame 710a is evaluated to determine whether it is FR, HR, QR, or ER. Such rates are deemed critical for transmission. If the frame 710a contains one of these critical rates, then the frame 710a is provided to the physical layer processing module 220 for transmission at step 840. If not, the frame is deemed to contain a non-critical rate, and the algorithm proceeds to step 830.

At step 830, the algorithm evaluates the current frame number of the transmission to determine whether a non-zero transmission should be made. In the exemplary embodiment shown, the current frame number FrameNumber is added to the current frame offset FrameOffset, and the result (FrameNumber+FrameOffset) is applied to a modulo operation (mod) with a non-blanking interval parameter N. If the result of the modulo operation is 0, the algorithm proceeds to step 835. Otherwise, the algorithm proceeds to step 850.

At step 835, a null rate indicator (NRID) frame may be transmitted. Such a frame may correspond to a predetermined frame or indicator recognizable to the receiver as containing no new information, also referred to as a frame comprising null traffic data. Null traffic data may contain a bit pattern that the receiving vocoder does not use, and thus the null traffic data will be discarded by the receiving vocoder. In one aspect, for example, the predetermined null frame or indicator may be a known 1.8-kbps frame having null traffic data. In another aspect, for example, the predetermined frame or indicator may repeat the last transmitted 1.8-kbps frame, thereby indicating null traffic data.

At step 850, the systematic blanking module 715 provides a null rate (NR) frame to the physical layer processing module 220 for transmission. In an exemplary embodiment, a null rate frame contains no traffic bits, and thus consumes minimal signaling bandwidth. After transmission of the null rate frame, the algorithm returns to step 810 to receive the next voice frame 710a from the vocoder 710.

FIGS. 9 and 9A illustrate exemplary frame transmission sequences 710a* and 715a*, respectively, as processed by a vocoder 710 and a systematic blanking module 715.

In FIG. 9, the sequence of frames 710a* includes eighth-rate frames labeled "ER" and vocoder null rate frames labeled "VNR" generated by the vocoder 710.

In FIG. 9A, the frame transmission sequence 715a* corresponds to the result of applying a selective blanking algorithm such as 800 to the transmission sequence 710a*, wherein a non-blanking interval N=4 is used. In FIG. 9A, the sequence of frames 715a* includes eighth-rate frames ER and null-rate frames NR. FrameNum 0 is transmitted directly as received from the vocoder 710, i.e., as an ER frame. FrameNum's 1 through 3 are transmitted as NR frames, and FrameNum 4 is transmitted as an NRID frame, in accordance with a non-blanking interval N=4. Note the NRID frame is transmitted to guarantee periodic non-zero rate frame transmission, as described with reference to the algorithm 800. The processing of FrameNum's 5 through 13 may readily be understood by one of ordinary skill in the art in light of the preceding description.

Figure 10:
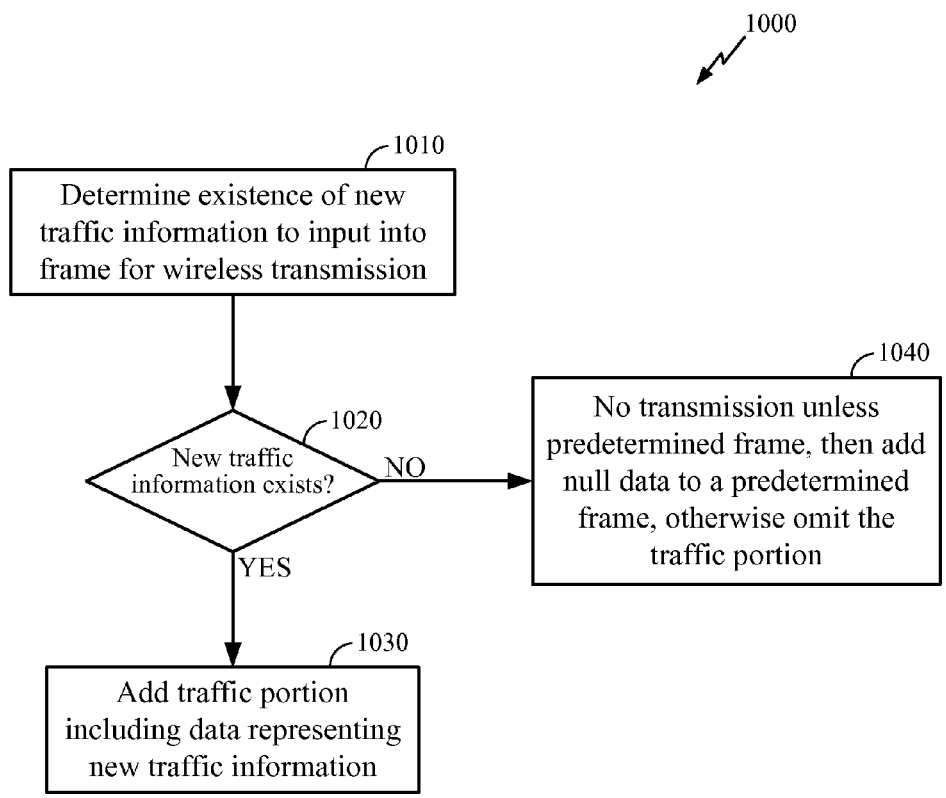
FIG. 10 illustrates an exemplary embodiment of a method for systematic blanking according to the present disclosure.

FIG. 10 illustrates an exemplary embodiment of a method 1000 for systematic blanking according to the present disclosure. Note the method 1000 is shown for illustrative purposes only, and is not meant to limit the scope of the present disclosure to any particular method shown.

In FIG. 10, at step 1010, a determination can be made as to the existence of new traffic information, the new traffic information to be included in a frame for transmission over a wireless communications link.

At step 1020, a decision block determines the result of the determination at step 1010.

At step 1030, if new traffic information exists, a traffic portion comprising data representing the new traffic information can be added to a frame.

At step 1040, if no new traffic information exists, then no new frame is transmitted unless the respective frame corresponds to the frame guaranteed for transmission. In this case, generate the frame guaranteed for transmission including null traffic data recognizable by the receiving vocoder as the null data rate.

Figure 11:
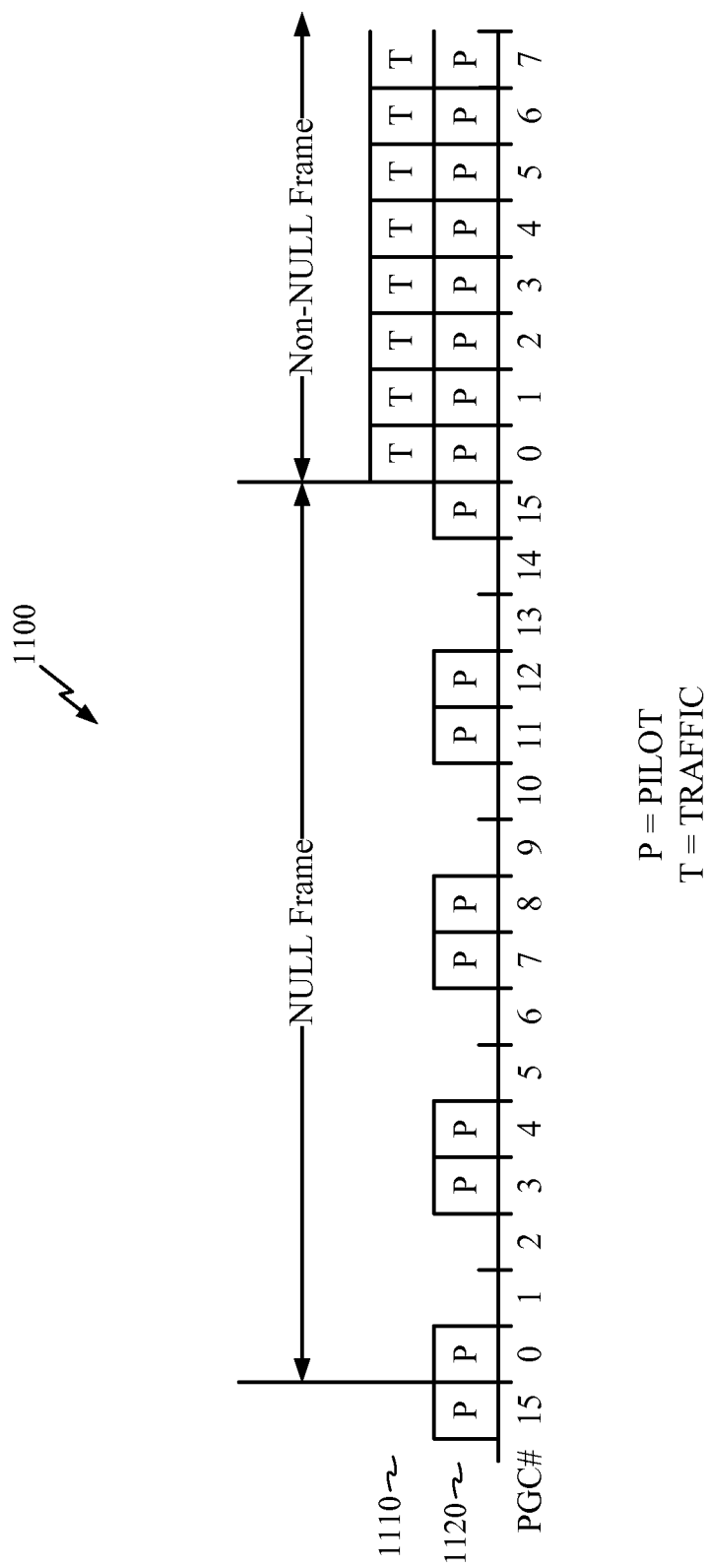
FIG. 11 illustrates an exemplary embodiment of a pilot gating scheme according to the present disclosure.

FIG. 11 illustrates an exemplary embodiment of a pilot gating scheme for identifying null rate frame transmissions according to the present disclosure. Note the pilot gating scheme is given for illustrative purposes only, and is not meant to limit the scope of the present disclosure to systems wherein a null rate frame transmission is necessarily accompanied by a gated pilot transmission.

In FIG. 11, a traffic portion 1110 of a TX transmission is shown along with a pilot portion 1120. The pilot portion 1120 is seen to have a different pattern during transmission of a null rate frame than during transmission of a non-null rate frame. For example, as shown in FIG. 11, the pilot gating pattern for a null frame may correspond to 2 sub-segments or PCG's wherein the pilot is turned on (indicated by "P" in FIG. 11), alternating with 2 sub-segments or PCG's wherein the pilot is turned off. The use of a different pilot gating pattern during null frame transmissions may further assist a receiver in determining whether a frame currently being received is a null frame. This may be used, e.g., during null rate determination step 630 in FIG. 6.

One of ordinary skill in the art will appreciate in light of the present disclosure that alternative pilot gating patterns may be readily derived to signal the presence of null frames. For example, the pilot gating pattern may include pilot transmissions every other sub-segment or PCG, or using any other pattern. Such alternative techniques are contemplated to be within the scope of the present disclosure.

In another aspect of the present disclosure, to further reduce the signal transmissions of the system, the power control rate of the forward link and/or reverse link of the system may be reduced. In an exemplary embodiment, the mobile station may reduce the number of forward link power control commands sent to the base station, such as by only sending forward link power control commands only during PCG's corresponding to the gated reverse link pilot transmissions, even in frames where the reverse link pilot portion is continuous (i.e., non-gated). In another exemplary embodiment, the base station may transmit reverse link power control commands at a reduced rate, such as in every other power control group. Further, the mobile station receiving these reverse link power control commands may apply each one to control transmissions of non-null frames. For null frames, a reduced number (e.g. less than all) of the received power control commands from the base station may be utilized to control the mobile station's transmissions of null frames, such as when the reverse link pilot portion is gated, as described above. These exemplary power control techniques are further described with reference to FIGS. 12 through 14.

Figure 12:
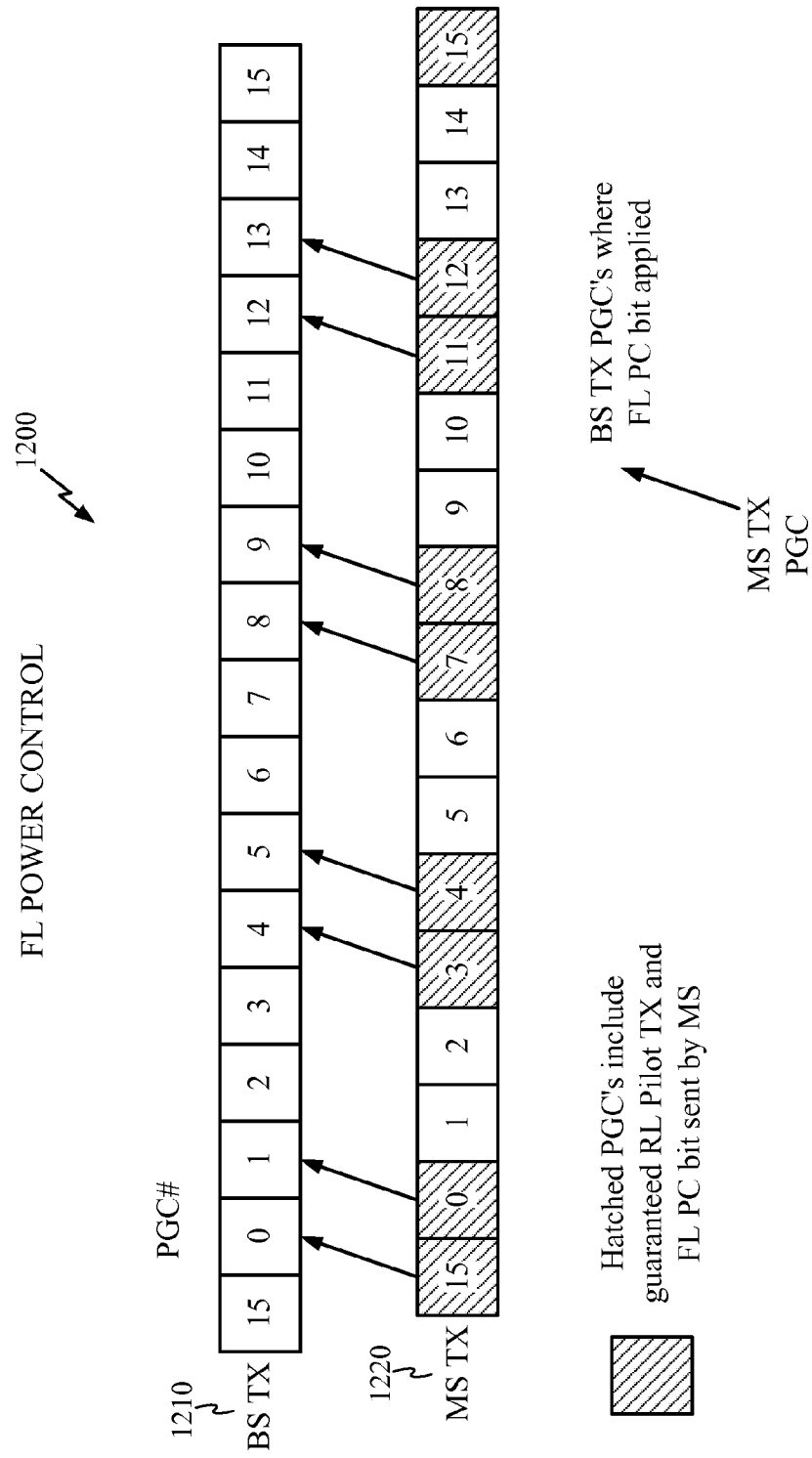
FIG. 12 illustrates an exemplary embodiment of a reduced rate power control scheme for controlling the power of forward link (FL) transmissions according to the present disclosure.

FIG. 12 illustrates an exemplary embodiment 1200 of a reduced rate power control scheme for controlling the power of forward link (FL) transmissions according to the present disclosure.

In FIG. 12, base station transmissions (BS TX) 1210 are shown along with mobile station transmissions (MS TX) 1220. The PCG's containing forward link (FL) power control (PC) commands sent by a mobile station are shown as hatched PCG's in 1220. An upward-right arrow originates from each hatched PCG's, and points to the forward link PCG transmitted by the base station wherein the received FL PC commands is applied. For example, the FL PC command sent by the mobile station in RL PCG #3 is applied by the base station in transmitting FL PCG #4, etc.

Note in FIG. 12, the hatched PCG's in 1220 correspond to the RL PCG's wherein the RL TX pilot is turned on, according to the gated pilot scheme 1100 shown in FIG. 11. At the same time, the mobile station only sends FL PC commands in RL PCG's corresponding to the hatched PCG's, as shown in 1220. The mobile station does not send FL PC commands in the non-hatched RL PCG's. The FL PC commands are thus transmitted only in those RL PCG's that are also transmitted during the gated pilot scheme, regardless of whether a gated pilot pattern is employed or not for the particular frame. One of ordinary skill in the art will appreciate that this may reduce the complexity of FL PC processing, while also reducing the overall FL PC rate.

Figure 13:
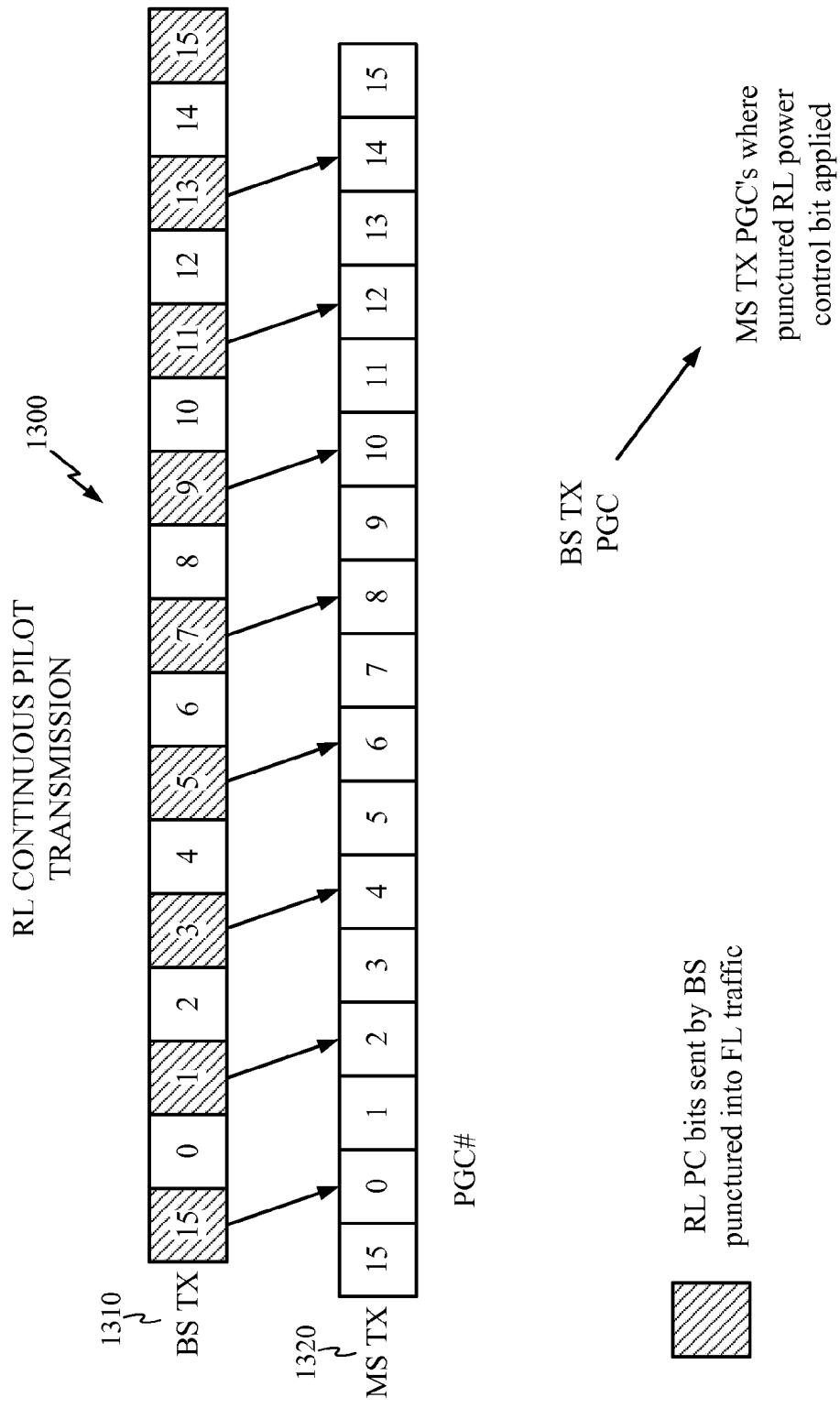
FIG. 13 illustrates an exemplary embodiment of a reduced rate power control scheme for controlling the power of reverse link (RL) continuous pilot transmissions according to the present disclosure.

FIG. 13 illustrates an exemplary embodiment 1300 of a reduced rate power control scheme for controlling the power of reverse link (RL) continuous pilot transmissions according to the present disclosure.

In FIG. 13, the PCG's containing forward link (RL) power control (PC) commands sent by a base station are shown as hatched PCG's in 1310. A downward-right arrow originates from each hatched PCG, and points to the reverse link PCG transmitted by the mobile station that applies the corresponding received RL PC commands. For example, the RL PC command sent by the base station in FL PCG #3 is applied by the mobile station in transmitting RL PCG #4, etc.

In FIG. 13, the base station only sends RL PC commands in FL PCG's corresponding to the hatched PCG's, as shown in 1310. The base station does not send RL PC commands in the non-hatched PCG's.

Figure 14:
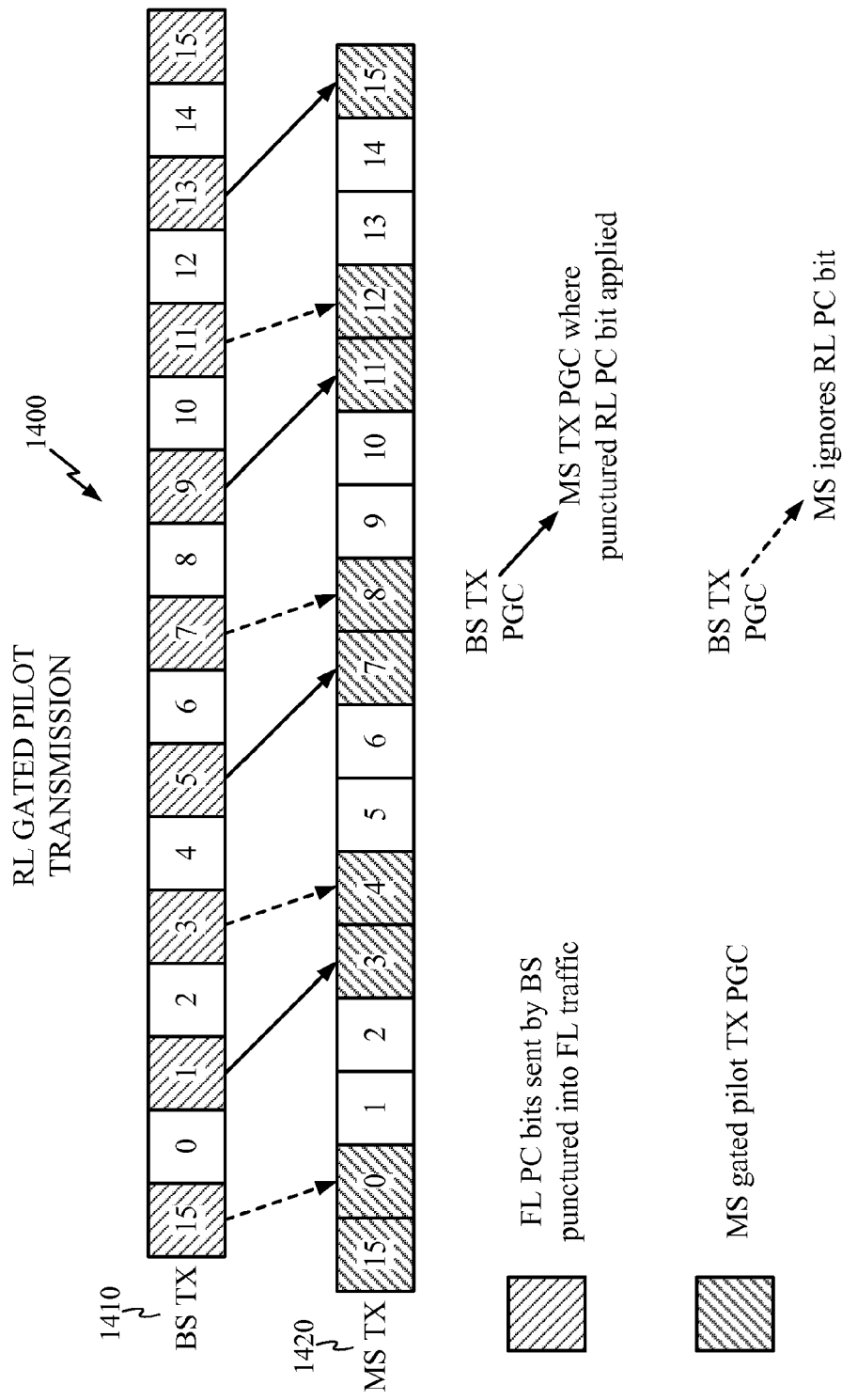
FIG. 14 illustrates an exemplary embodiment of a reduced rate power control scheme for controlling the power of reverse link (RL) gate pilot transmissions according to the present disclosure.

FIG. 14 illustrates an exemplary embodiment 1400 of a reduced rate power control scheme for controlling the power of reverse link (RL) gated pilot transmissions according to the present disclosure.

In FIG. 14, the PCG's containing forward link (RL) power control (PC) commands sent by a base station are again shown as hatched PCG's in 1410. A solid downward-right arrow originates from a hatched PCG, and points to the reverse link PCG transmitted by the mobile station that applies the corresponding received RL PC commands. On the other hand, a dashed arrow originating from a hatched PCG indicates an RL PC command transmitted by the base station that is not applied by the MS to the corresponding RL PCG pointed to. The base station only sends RL PC commands in FL PCG's corresponding to the hatched PCG's. The base station does not send RL PC commands in the non-hatched PCG's.

For example, the RL PC command sent by the base station in FL PCG #1 is applied by the mobile station in transmitting RL PCG #3, etc. On the other hand, the RL PC command sent by the base station in FL PCG #2 is not applied by the mobile station in transmitting RL PCG #4. Instead, in an exemplary embodiment, the mobile station can maintain the same power level as used for the previous PCG, e.g., RL PCG #3 in the example described. In an aspect of the present disclosure, this may be done to simplify the processing of RL PC commands by the mobile station.

Figure 15:
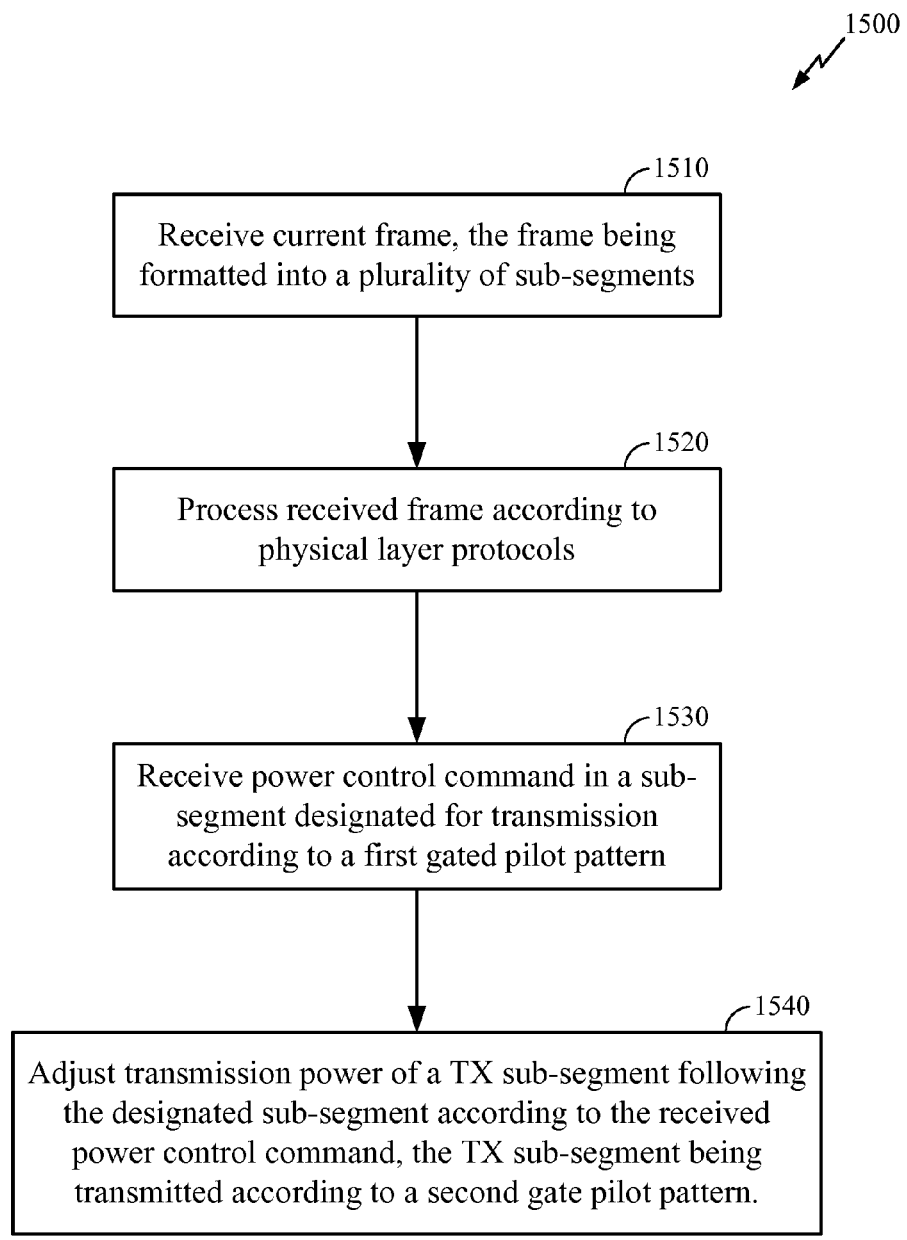
FIG. 15 illustrates a method according to the present disclosure.

FIG. 15 illustrates a method 1500 according to the present disclosure. Note the method 1500 is shown for illustrative purposes only, and is not meant to limit the scope of the present disclosure.

At step 1510, a current frame is received, the frame being formatted into a plurality of sub-segments.

At step 1520, the received frame is processed according to physical layer protocols.

At step 1530, a power control command received in a sub-segment designated for transmission according to a first gated pilot pattern is received.

At step 1540, the transmission power of a TX sub-segment following the designated sub-segment is adjusted according to the received power control command, the TX sub-segment being transmitted according to a second gate pilot pattern.

According to another aspect of the present disclosure, techniques are provided for early termination of forward and/or reverse link transmissions in a wireless communications system to save power and increase capacity.

Figure 16:
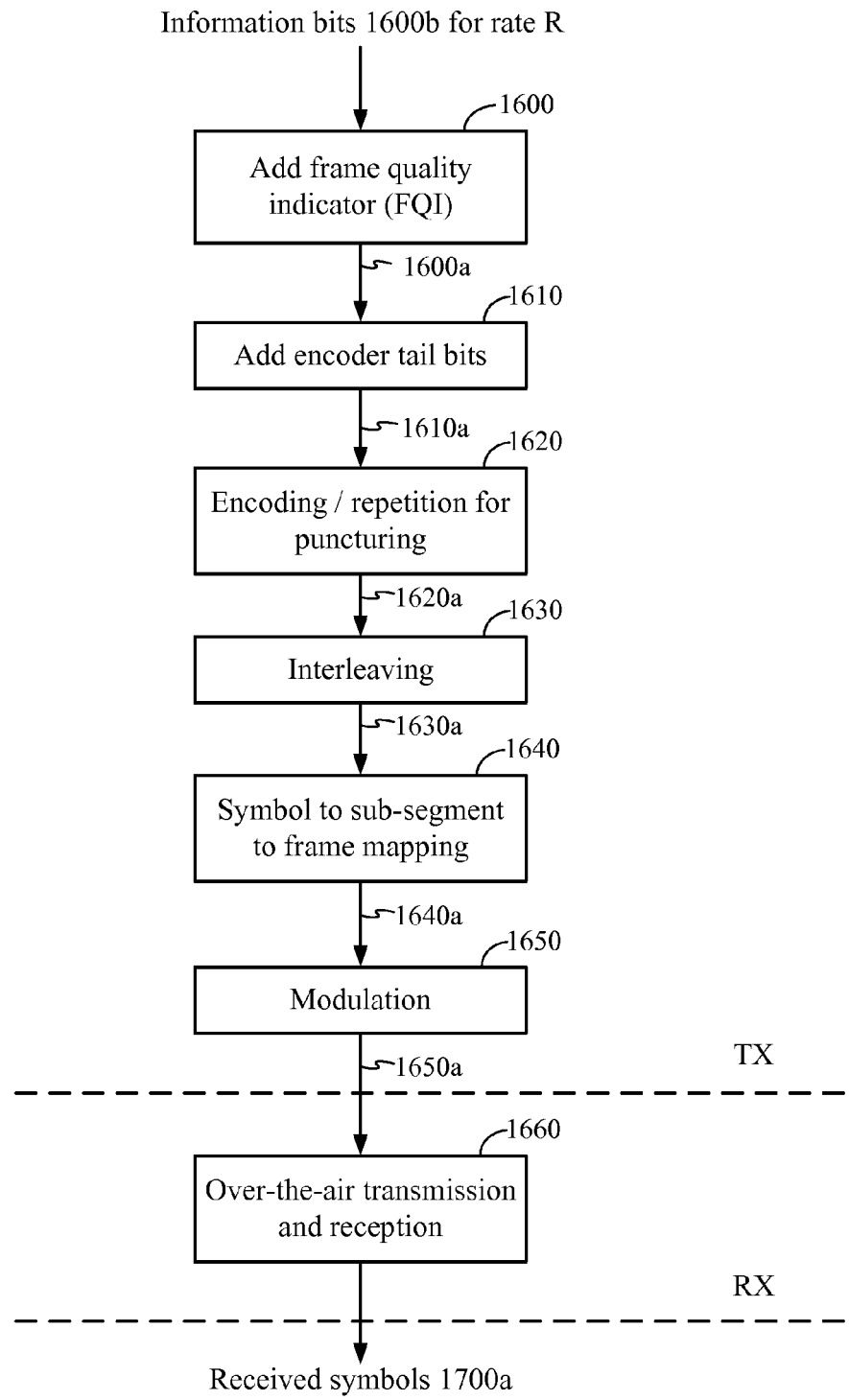
FIG. 16 illustrates a prior art frame processing scheme for processing information bits at a transmitter in a communications system.
Figure 16A:
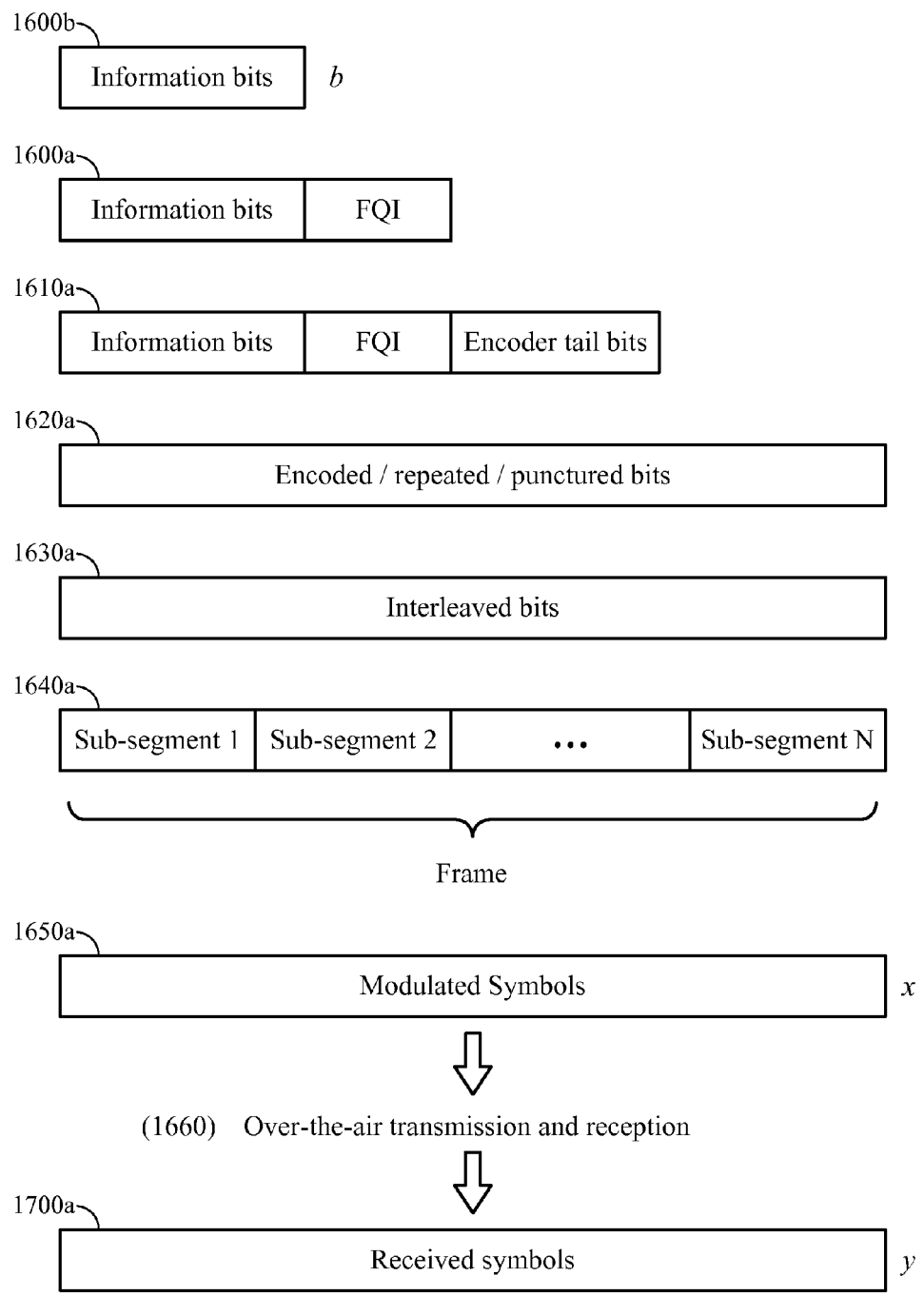
FIG. 16A illustrates the status of the data processed by the operations illustrated in FIG 16.

FIG. 16 illustrates a prior art frame processing scheme for processing information bits 1600b at a transmitter in a communications system. In certain exemplary embodiments, the frame processing scheme shown may be utilized in the forward link or reverse link transmissions of a wireless communications system. FIG. 16A illustrates the status of the data processed by the operations illustrated in FIG. 16.

Note the frame processing scheme is shown for illustrative purposes only, and is not meant to restrict the scope of the present disclosure to any particular processing scheme shown. Alternative exemplary embodiments of the present disclosure may adopt alternative frame processing schemes which may, e.g., re-order the steps of the scheme shown in FIG. 16, and/or add steps to or delete steps from the scheme shown. Such alternative exemplary embodiments are contemplated to be within the scope of the present disclosure.

In FIG. 16, an information source generates information bits 1600b at a selected rate R. The number of information bits 1600b generated per frame may depend on the selected rate R. For example, in a cdma2000 system, there may be 172 information bits per 20-millisecond frame ("full rate"), 80 bits per frame ("half rate"), 40 bits per frame ("quarter rate"), or 16 bits per frame ("eighth rate"). The information bits 1600b for a frame are collectively denoted by the variable b in FIG. 16A.

At step 1600, a frame-quality indicator (FQI) may be generated and appended to the information bits 1600b for a frame. For example, an FQI may be a cyclical-redundancy check (CRC) known to one of ordinary skill in the art. Signal 1600a represents the combination of the information bits 1600b and the FQI, as also illustrated in FIG. 16A.

At step 1610, encoder tail bits may be added to the signal 1600a. For example, encoder tail bits may represent a fixed number of zero-valued tail bits for use with a convolutional encoder. Signal 1610a represents the combination of signal 1600a with the encoder tail bits, as also illustrated in FIG. 16A.

At step 1620, the signal 1610a is encoded and repeated (or punctured). As earlier described, the encoding may include convolutional encoding or turbo encoding, and the repetition may serve to further increase (or decrease, in the case of puncturing) the transmitted energy associated with each symbol. Note the encoding may employ other techniques known to one of ordinary skill in the art, such as block encoding or other types of encoding, and need not be limited to the encoding explicitly described in the present disclosure. The signal 1620a represents the encoded and repeated (or punctured) version of signal 1610a, as also illustrated in FIG. 16A.

At step 1630, the signal 1620a is interleaved, e.g., to improve the diversity of the encoded symbols along a chosen signal dimension. In an exemplary implementation, the symbols may be interleaved over time. Signal 1630a represents the interleaved version of signal 1620a, as also illustrated in FIG. 16A.

At step 1640, the interleaved symbols of signal 1630a are mapped to a pre-defined frame format, as also illustrated in FIG. 16A. A frame format may specify the frame as being composed of a plurality of sub-segments. In an exemplary embodiment, sub-segments may be any portions of the frame contiguous along a given dimension, e.g., time, frequency, code, or any other dimension. A frame may be composed of a fixed plurality of such sub-segments, each sub-segment containing a portion of the total number of symbols allocated to the frame. For example, in an exemplary embodiment according to the W-CDMA standard, a sub-segment may be defined as a slot. In an exemplary embodiment according to the cdma2000 standard, a sub-segment may be defined as a power control group (PCG).

In certain exemplary embodiments, the interleaved symbols may be mapped in time, frequency, code, or any other dimensions used for signal transmission. Furthermore, a frame format may also specify the inclusion of, e.g., control symbols (not shown) along with the interleaved symbols of signal 1630a. Such control symbols may include, e.g., power control symbols, frame format information symbols, etc. Signal 1640a represents the output of the symbol-to-frame mapping step 1640, as also illustrated in FIG. 16A.

At step 1650, the signal 1640a is modulated, e.g., onto one or more carrier waveforms. In certain exemplary embodiments, the modulation may employ, e.g., QAM (quadrature amplitude modulation), QPSK (quadrature phase-shift keying), etc. Signal 1650a represents the modulated version of the signal 1640a, as also illustrated in FIG. 16A. Signal 1650a is further denoted by the variable x in FIG. 16A.

At step 1660, the modulated signal 1650a is further processed, transmitted over the air, and received by a receiver. Step 1660 generates the received symbols 1700a, further denoted by the variable y in FIG. 16A. Note one of ordinary skill in the art will appreciate that the techniques for processing the signal 1650a for transmission and reception over-the-air are well-known, and are not further disclosed herein. The symbols contained in y may be further processed as described hereinbelow.

Figure 17:
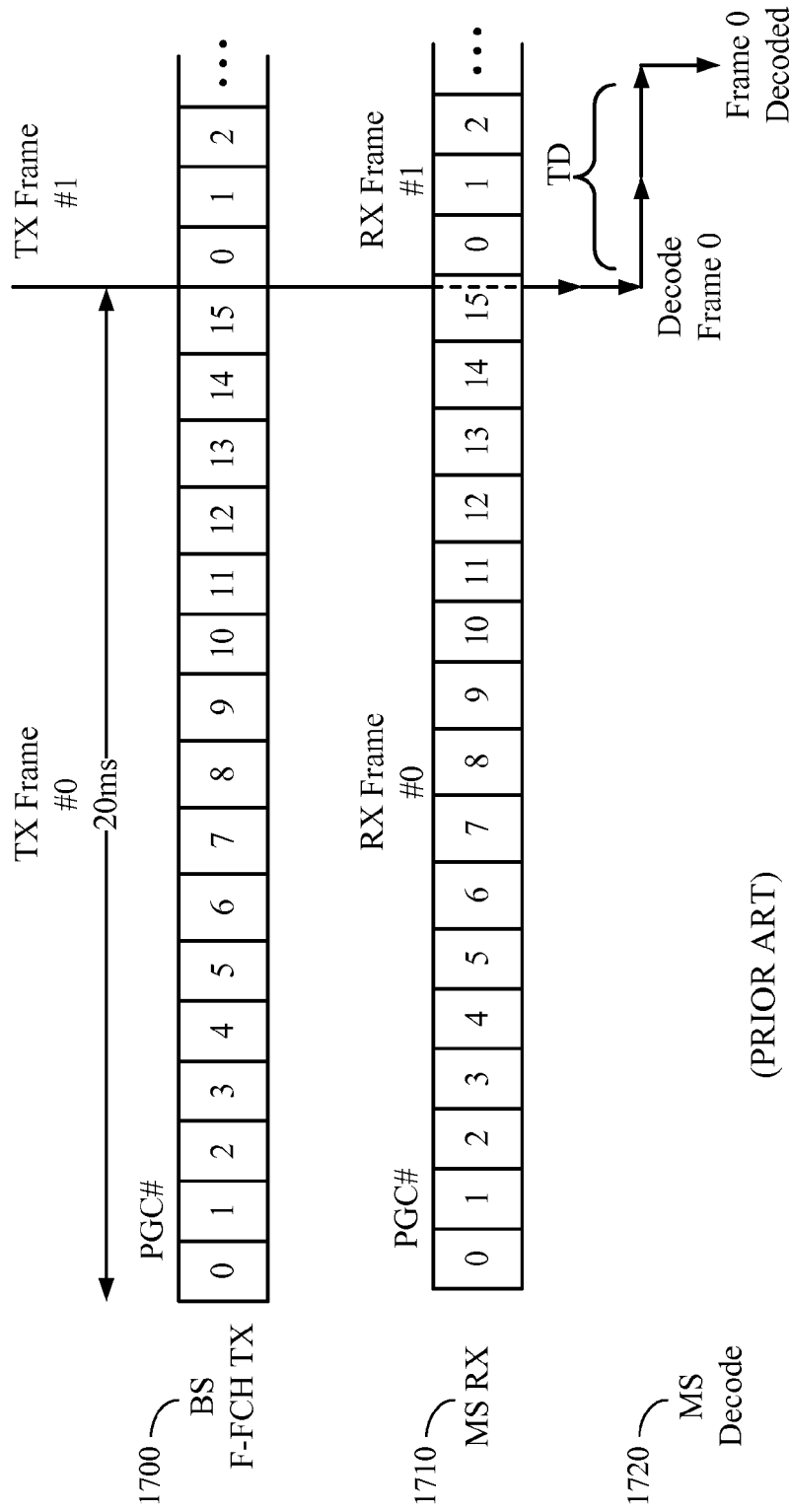
FIG. 17 illustrates timing diagrams associated with a prior art forward link signaling scheme for cdma2000.

FIG. 17 illustrates timing diagrams associated with a prior art forward link signaling scheme for cdma2000.

In FIG. 17, the base station (BS) transmits at 1700 a series of frames on a forward fundamental channel (F-FCH TX) to the mobile station (MS). In the exemplary embodiment shown, the sub-segments correspond to power control groups (PCG's), sixteen (numbered 0 to 15) of which make up each frame. Upon transmitting all sixteen PCG's corresponding to a first frame TX Frame #0, the BS begins transmitting the next frame TX Frame #1. In an exemplary embodiment, the data transmitted may be processed as previously described herein with reference to FIGS. 16 and 16A.

On the MS side, the MS receives at 1710 the PCG's transmitted. Upon receiving the last PCG (i.e., PCG #15) of RX Frame #0 corresponding to TX Frame #0, the MS begins decoding RX Frame #0 using all PCG's received. The decoded information is available a decoding time TD thereafter. In an exemplary embodiment, the decoding may be performed as described hereinbelow with reference to FIG.

18. Note while the MS is decoding TX Frame #0, the PCG's of TX Frame #1 are simultaneously received.

Figure 18:
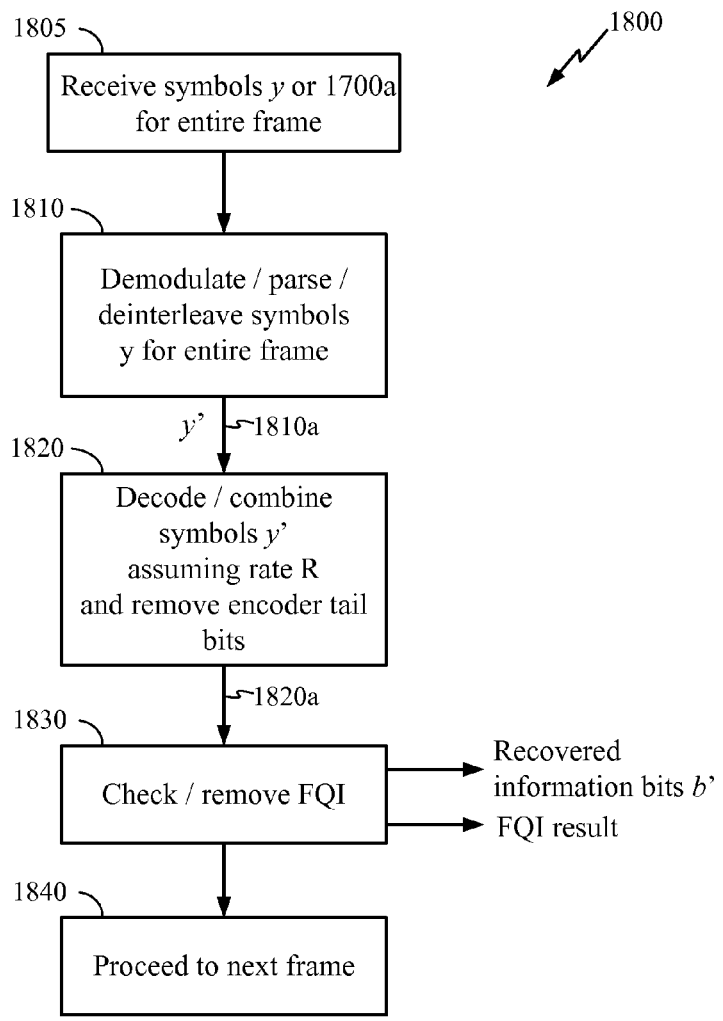
FIG. 18 illustrates a prior art method for recovering estimated information bits b' from received symbols y.

FIG. 18 illustrates a prior art method 1800 for recovering estimated information bits b' from received symbols y.

At step 1805, symbols y or 1700a are received for an entire frame.

At step 1810, the symbols y or 1700a are demodulated, parsed, and deinterleaved to produce symbols y', also denoted as signal 1810a. One of ordinary skill in the art will appreciate that the operations performed at step 1810 may correspond to an inverse of the operations performed at the transmitter, as shown in, e.g., FIG. 16.

At step 1820, the symbols y' are decoded and combined, given knowledge of the rate R. In an implementation, the rate R may indicate how many bits are present in a received frame, and may be used, e.g., by the decoder to determine at which point in the received symbol sequence to terminate decoding, and/or remove tail bits from the decoded sequence. At step 1820, tail bits of the decoded sequence, e.g., as appended at step 1610 of FIG. 16, may also be removed. The result of step 1820 is an output signal 1820a.

At step 1830, the FQI, e.g., as appended at step 1600 of FIG. 16, is checked, and also removed from the information bits. In an implementation, the result of the FQI check may identify the decoding as either a success or a failure. Step 1830 generates the recovered information bits, denoted as b', along with the FQI result, which may indicate either a success or failure.

At step 1840, the method may proceed to the next frame, and repeat the steps described above for the next frame.

In accordance with the present disclosure, early frame decoding and termination techniques as described hereinbelow may allow the overall communications system 100 to operate more efficiently and save transmission power, thereby increasing cellular capacity.

Figure 19:
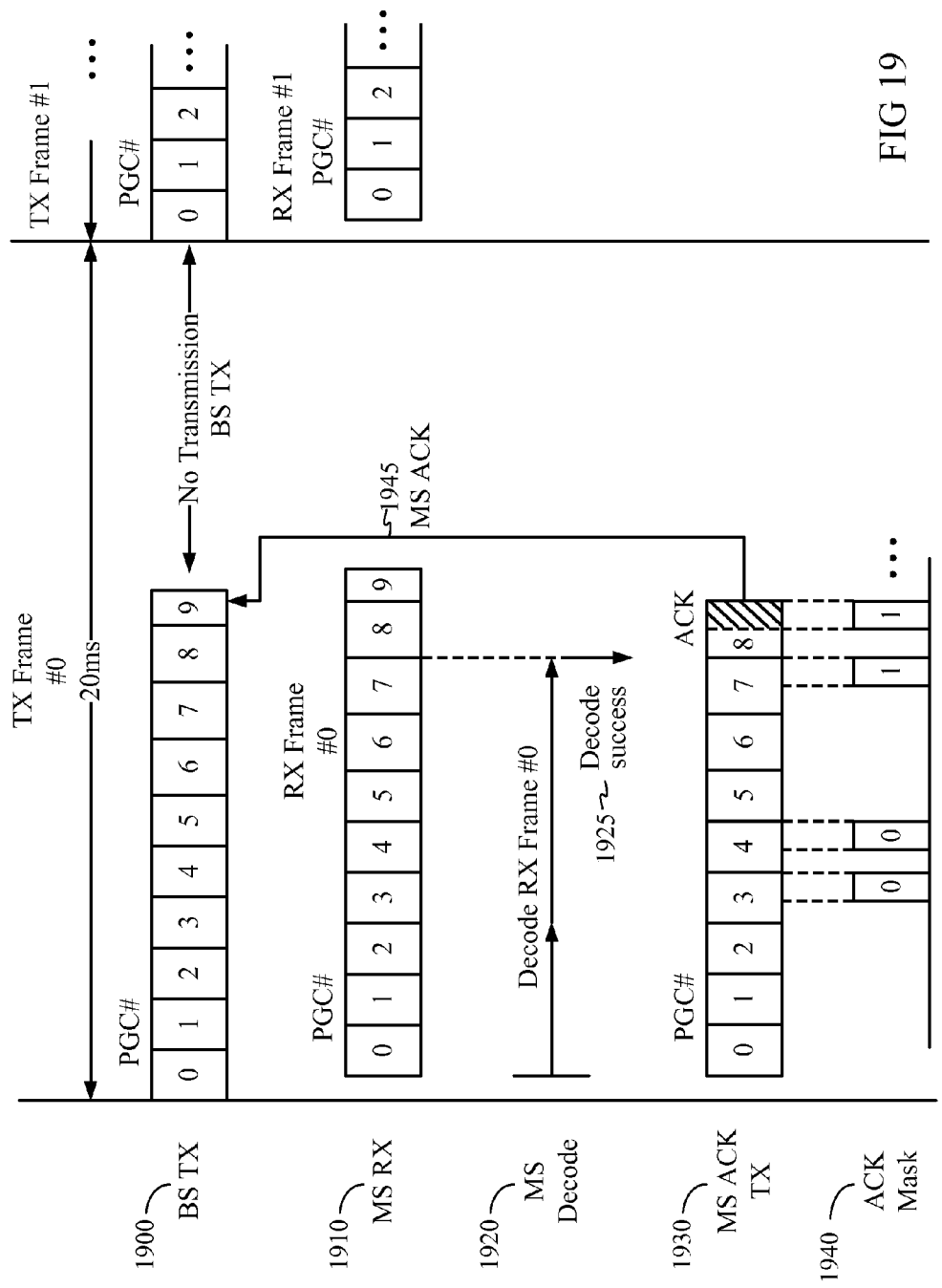
FIG. 19 illustrates an exemplary embodiment of a scheme for early termination of forward link transmissions for systems operating according to the cdma2000 standard.

FIG. 19 illustrates an exemplary embodiment of a scheme for early termination of forward link transmissions for systems operating according to the cdma2000 standard. Note the exemplary embodiment is shown for illustrative purposes only, and is not meant to limit the scope of the present disclosure to cdma2000. One of ordinary skill in the art will also appreciate that specific PCG and frame numbers referred to herein are for illustrative purposes only, and are not meant to limit the scope of the present disclosure.

In FIG. 19, the base station (BS) transmits a series of frames at 1900 to the mobile station (MS). In an exemplary embodiment, the transmissions may be done on a fundamental forward channel (F-FCH TX). As described earlier hereinabove, each sub-segment shown in FIG. 19 may correspond to a power control group (PCG) in cdma2000. The BS commences transmission with PCG #0 of TX Frame #0, and continuously transmits PCG's until an ACK signal 1945 is received from the MS after PCG #8. The ACK signal is transmitted by the MS to signal to the BS that the MS has successfully decoded the entire TX Frame #0 based on the PCG's already received.

Upon receiving the ACK 1945, the BS ceases transmission of PCG's corresponding to TX Frame #0, and waits until the beginning of the next frame, TX Frame #1, before transmitting PCG's for the new frame TX Frame #1. Note during the finite period of time associated with receiving and processing the ACK signal 1945, the BS may already have begun transmitting PCG #9 of TX Frame #0.

Reference numerals 1910 through 1940 illustrate the timing of actions taken by the MS to generate the ACK signal 1945 sent to the BS that allows early termination of TX frame transmissions by the BS.

At 1910, the MS receives the PCG's for TX Frame #0 and TX Frame #1 as RX Frame #0 and RX Frame #1, respectively.

At 1920, the MS attempts to decode RX Frame #0 as each PCG of RX Frame #0 is received, without waiting for all sixteen PCG's allocated to RX Frame #0 to be received. In an exemplary embodiment, to accomplish such decoding on a per-PCG basis, the MS may utilize a per-sub-segment decoding algorithm such as 2000 later described hereinbelow with reference to FIG. 20.

At 1925, after receiving PCG #7, the MS successfully decodes RX Frame #0, as determined by, e.g., checking the CRC associated with the received bits. The MS declares a decoding success, and proceeds to the ACK transmission 1930.

At 1930, after declaring decoding success at 1925, the MS transmits an MS ACK signal 1945 to the BS during a portion of the transmission associated with PCG #8 of the reverse link.

In an exemplary embodiment, the MS may simply transmit the ACK signal during the PCG immediately subsequent to, or at any PCG subsequent to, the PCG in which a decoding success is determined. In an alternative exemplary embodiment such as that shown in FIG. 19, the timing of the ACK signal 1945 transmission may be controlled by an ACK mask 1940. The ACK mask is operable to specify when the acknowledgement may be transmitted and/or when the acknowledgement may not be transmitted. Providing such an ACK mask may limit the communication link capacity utilized by the sending of acknowledgement messages.

In FIG. 19, the ACK mask 1940 is characterized by time intervals designated "1" during which ACK transmission on the reverse link is allowed. ACK transmissions are not allowed during time intervals designated "0." In an exemplary embodiment, by restricting ACK transmissions to only time intervals after a threshold PCG, the ACK mask may ensure that decoding is only attempted when a sufficient portion of the received frame has been processed. According to the present disclosure, the MS may transmit an ACK message in the next time period designated as "1" by an ACK mask that immediately follows a successful decode.

Note the particular ACK mask configurations shown herein are for illustrative purposes only, and are not meant to restrict the scope of the present disclosure to any ACK mask shown. One of ordinary skill in the art will appreciate that alternative ACK mask configurations may readily be provided to allow ACK transmission during different portions of the sub-segments or PCG's than those shown. Such alternative exemplary embodiments are contemplated to be within the scope of the present disclosure.

In an exemplary embodiment, the ACK mask pattern may overlap with the pattern for an RL gated pilot pattern used to signal an NR frame transmission, such as earlier described herein with reference to FIG. 11.

Figure 20:
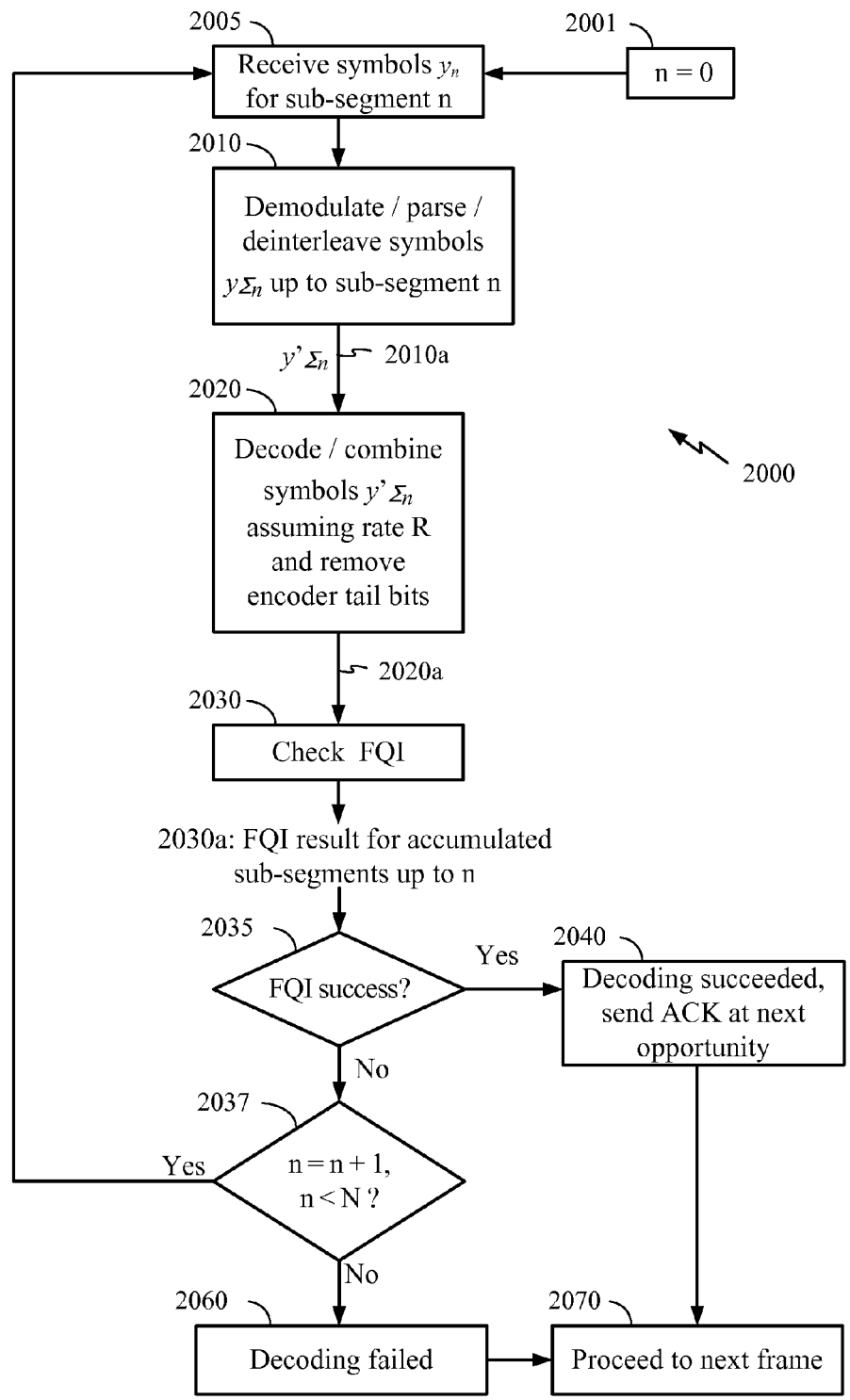
FIG. 20 illustrates an exemplary embodiment of a per-subsegment decoding scheme according to the present disclosure.

FIG. 20 illustrates an exemplary embodiment of a per-sub-segment decoding scheme according to the present disclosure. Note the method 2000 is shown for illustrative purposes only, and is not intended to restrict the scope of the present disclosure to any particular exemplary embodiments shown.

In FIG. 20, at step 2001, a sub-segment index n is initialized to n=0.

At step 2005, the method receives symbols $y_n$ for sub-segment n.

At step 2010, the method demodulates, parses, and deinterleaves all symbols $y_{\square,n}$ received up to and including sub-segment n of the current frame. $y_{\square,n}$ may include, e.g., all traffic symbols received from sub-segment 0 through sub-segment n, inclusive. The result of step 2010 is denoted as y'$_{\square n}$.

At step 2020, the method decodes and combines the symbols y'$_{\square n}$. One of ordinary skill in the art will appreciate that while the symbols y'$_{\square n}$ in general correspond to only a portion of the total symbols x allocated by the transmitter for the entire frame, "early" decoding of the entire frame using only the symbols y'$_{\square n}$ may nevertheless be attempted. Such an early decoding attempt may have a good chance of decoding success due to, e.g., redundancy in the symbols x introduced by fractional rate encoding and/or repetition, e.g., at step 1620 of FIG. 16, and/or time- or other-dimensional diversity achieved via interleaving at step 1630 of FIG. 16.

At step 2020, the encoded tail bits may further be removed from the decoded bit sequence to generate the signal 2020a.

At step 2030, the method checks the FQI from the signal 2020a, and generates an FQI result 2030a from the accumulated received sub-segments for the current frame up to n.

At step 2035, the method evaluates whether the FQI result indicated a success. If yes, the method proceeds to step 2040, wherein decoding is declared successful, and the method proceeds to ACK message generation to enable early termination of forward link transmissions. The next available opportunity may be, e.g., as specified by an ACK mask as described with reference to FIG. 5. If no, the method proceeds to step 2037.

At step 2037, the method increments n, and determines whether there are additional sub-segments left in the frame to be received. If yes, the method returns to step 2005. If no, the method proceeds to declare decoding for the frame unsuccessful at step 2060.

At step 2070, the decoder proceeds to evaluate the next frame.

Figure 21:
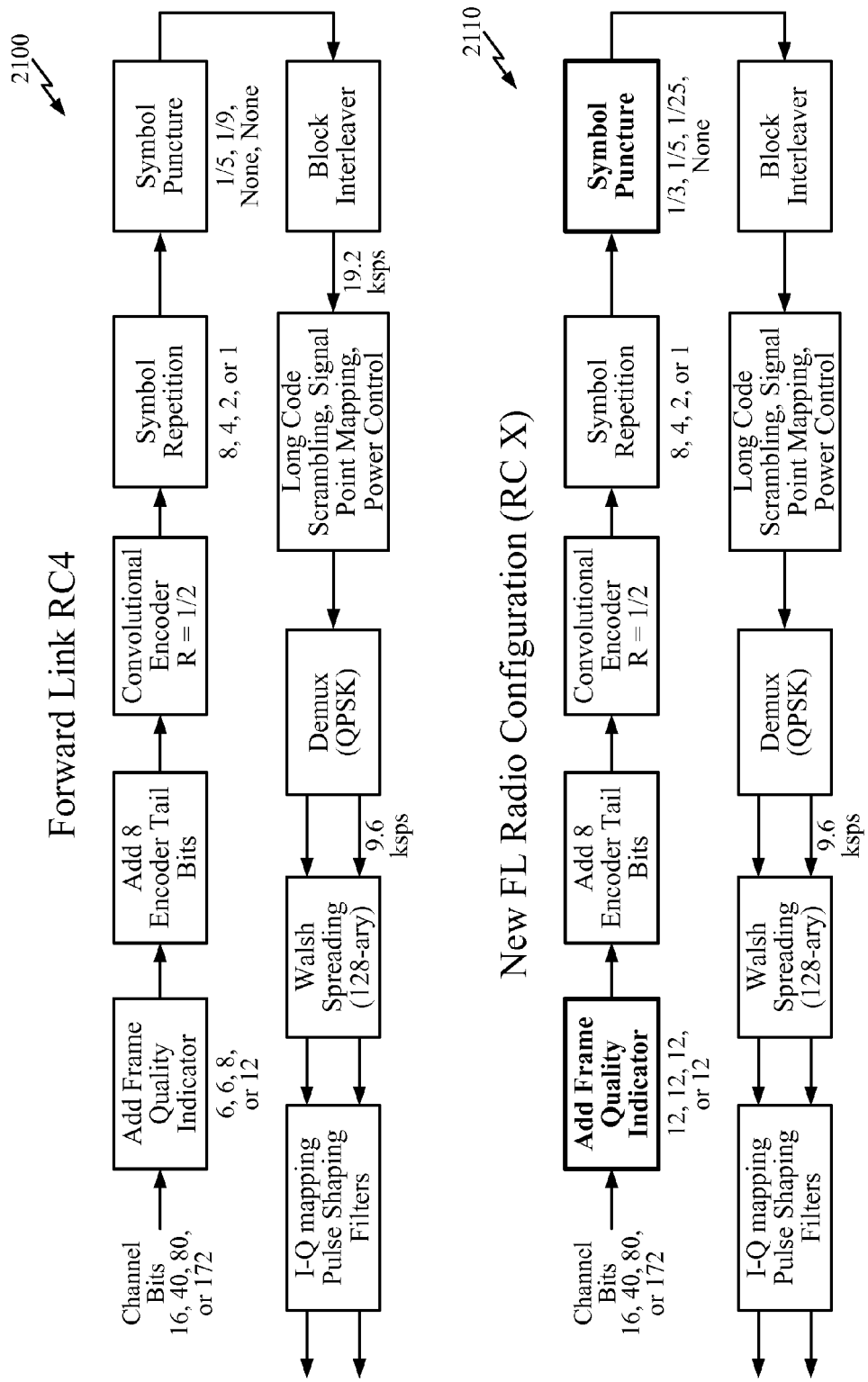
FIG. 21 illustrates an implementation of a prior art forward link symbol path for Radio Configuration 4 (RC4) according to the cdma2000 standard, as well as an exemplary embodiment of a forward link symbol path according to the present disclosure.

FIG. 21 illustrates an implementation 2100 of a prior art forward link symbol path for Radio Configuration 4 (RC4) according to the cdma2000 standard, as well as an exemplary embodiment 2110 of a forward link symbol path according to the present disclosure. In the implementation 2100, the frame quality indicator includes CRC's of length 6, 6, 8, or 12 that are appended to the bits of a frame, depending on the frame symbol rate. In the exemplary embodiment 2110 according to the present disclosure, the frame quality indicator includes CRC's of increased length 12, 12, 12, or 12 that are appended to the bits of a frame. The use of increased-length CRC's improves the performance of the early decoding schemes according to the present disclosure, allowing, e.g., more accurate detection of decoding success for early decoding techniques according to the present disclosure. Note the specific CRC lengths illustrated herein are provided for illustrative purposes only, and are not meant to limit the scope of the present disclosure to any particular CRC lengths illustrated.

As further shown in the implementation 2100, the symbol puncture rates are 1/5, 1/9, None, and None, depending on the frame symbol rate. In the exemplary embodiment 2110 according to the present disclosure, the symbol puncture rates are 1/3, 1/5, 1/25, and None, depending on the frame symbol rate. One of ordinary skill in the art will appreciate that the increased puncturing in the exemplary embodiment 2110 may be used to accommodate the increased length CRC's called for by the exemplary embodiment 2110.

Figure 22:
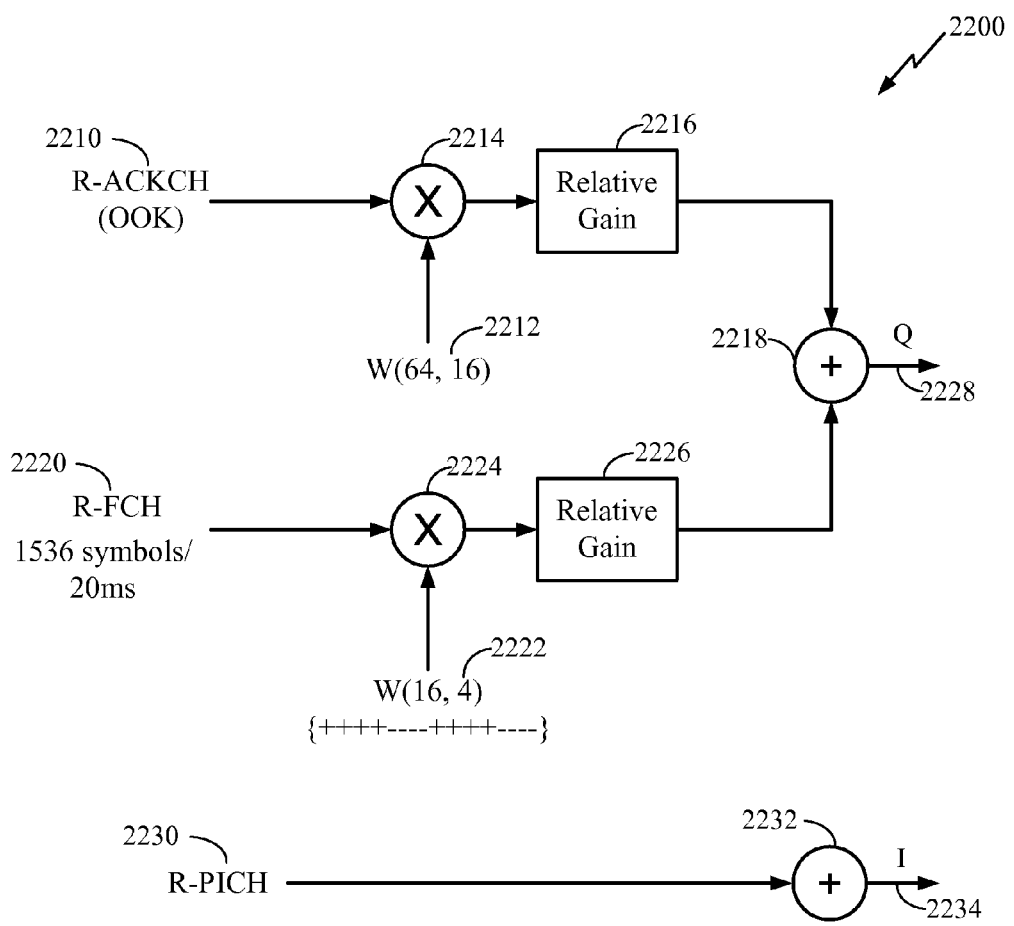
FIG. 22 illustrates an exemplary embodiment of a signaling scheme used to signal the ACK message on the reverse link for early termination modulator.

FIG. 22 illustrates an exemplary embodiment of a signaling scheme 2200 used to signal the ACK message on the reverse link for early termination of forward link transmissions. In FIG. 22, a reverse ACK channel (R-ACKCH) 2210 is modulated using on-off keying (OOK) onto a Walsh code W(64, 16) 2212 using modulator 2214. A relative channel gain 2216 is applied to the resultant signal, and provided to the additive combiner 2218.

In FIG. 22, a reverse fundamental channel (R-FCH) 2220 having a rate of 1536 symbols per 20 ms is modulated onto a Walsh code W(16,4) 2222 using a modulator 2224. A relative channel gain 2226 is applied to the resultant signal, and the result also provided to the additive combiner 2218. The output of the additive combiner may be provided on a quadrature (Q) channel 2228 for reverse link transmission to the BS. In the exemplary embodiment shown, an in-phase (I) channel 2234 is also provided that includes a reverse pilot channel (R-PICH) 2230.

Note the exemplary embodiment of the reverse link ACK signaling scheme shown with reference to FIG. 22 is given for illustrative purposes only, and is not meant to limit the scope of the present disclosure to any particular embodiment of an ACK signaling scheme. One of ordinary skill in the art will appreciate that alternative techniques for signaling an ACK on the reverse link may be readily derived in light of the present disclosure, including applying different forms of modulation, and sending the ACK message on alternative channels than shown. Such alternative exemplary embodiments are contemplated to be within the scope of the present disclosure.

Figure 23:
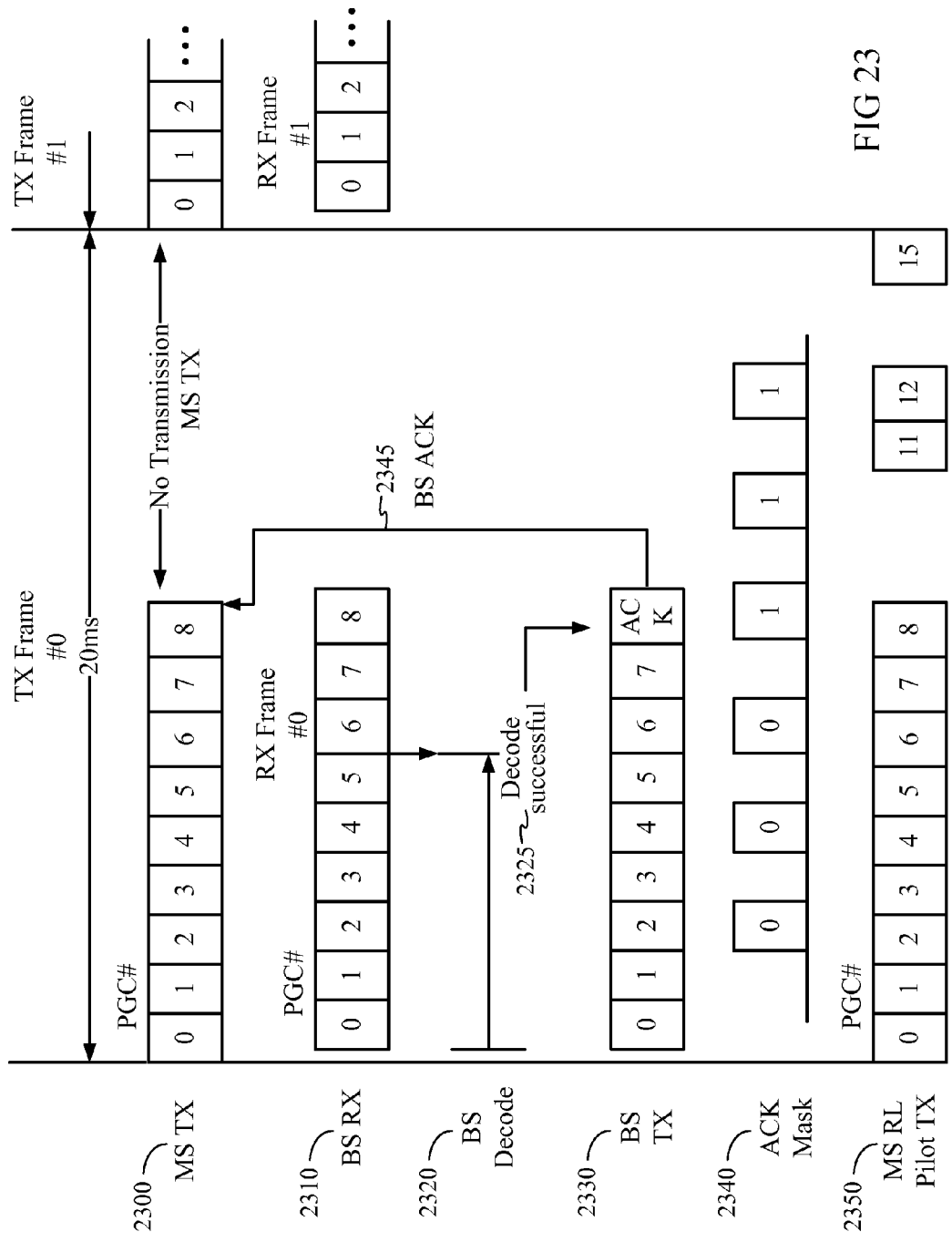
FIG. 23 illustrates an exemplary embodiment of a scheme for early termination of reverse link transmissions for systems operating according to the cdma2000 standard.

FIG. 23 illustrates an exemplary embodiment of a scheme 2300 for early termination of reverse link transmissions for systems operating according to the cdma2000 standard. Note the exemplary embodiment is shown for illustrative purposes only, and is not meant to restrict the scope of the present disclosure to any particular reverse link early termination scheme shown. One of ordinary skill in the art will appreciate that the specific PCG and Frame numbers referred to herein are for illustrative purposes only.

In FIG. 23, the mobile station (MS) transmits a series of frames at 2300 to the base station (BS). In an exemplary embodiment, the frames may be transmitted on a reverse fundamental channel (R-FCH TX). In FIG. 23, each sub-segment shown corresponds to a power control group (PCG). The MS commences transmission of TX Frame #0 at PCG #0, and continuously transmits PCG's until an ACK signal 2345 is received from the BS after PCG #8. Upon receiving the ACK 2345, the MS ceases transmission of PCG's corresponding to TX Frame #0, and waits until the beginning of the next frame, TX Frame #1, to begin transmitting PCG's corresponding to TX Frame #1.

Reference numerals 2310 through 2340 illustrate the timing of actions taken by the BS to generate the ACK signal 2345 sent to the MS that allows early termination of reverse link frame transmissions by the MS.

At 2310, the BS receives the PCG's of TX Frame #0 and TX Frame #1 as RX Frame #0 and RX Frame #1, respectively.

At 2320, the BS attempts to decode RX Frame #0 as each individual PCG is received, without waiting for all sixteen PCG's allocated to RX Frame #0 to be received. In an exemplary embodiment, to accomplish such decoding on a per-PCG basis, the BS may utilize a per-sub-segment decoding algorithm such as 2000 earlier described with reference to FIG. 20.

At 2325, after receiving PCG #5, the BS declares a decoding success, and proceeds to the ACK transmission step 2330 to generate the BS ACK TX signal.

At 2330, after declaring decoding success at step 2325, the BS transmits an ACK signal 2345 during a portion of the transmission associated with PCG #8 of the Forward Link.

The portion of the transmission during which an ACK signal 2345 is sent may be defined by a corresponding ACK mask 2340.

In an exemplary embodiment, the ACK mask pattern may allow ACK transmission only during those PCG's in which a power control command is sent on the forward link (FL) to control reverse link (RL) power transmissions, as earlier described herein with reference to FIG. 13.

In FIG. 23, 2350 further illustrates the transmission of the reverse link pilot signal by the MS according to the exemplary embodiment of the reverse link early termination scheme. At step 2350, after the ACK signal 2345 is received by the MS from the BS at PCG #8, the MS ceases transmitting the RL pilot signal at every PCG. Rather, as shown, the RL pilot signal transmission may be gated OFF for select PCG's. This may serve to both conserve RL pilot signal transmission power for the remaining PCG's, as well as to provide an additional ACK signaling mechanism to the BS. In an exemplary embodiment, the RL gated pilot pattern for the remaining PCG's may correspond to a pattern used to signal an NR frame transmission, such as earlier described herein with reference to FIG. 11.

In the exemplary embodiment shown, the RL pilot signal is gated OFF during PCG's 9, 10, 13, and 14. In general, the RL pilot signal may be gated OFF in alternating groups of two PCG's after the ACK signal is transmitted, until the end of the early terminated frame. It should further be noted that, as with pilot gating of NR frames, various schemes may be utilized for the pilot gating of early terminated frames, such as: 1 power control group on/1 power control group off; 2 power control group on/2 power control group off, and any other pattern operable to reduce power.

Figure 24:
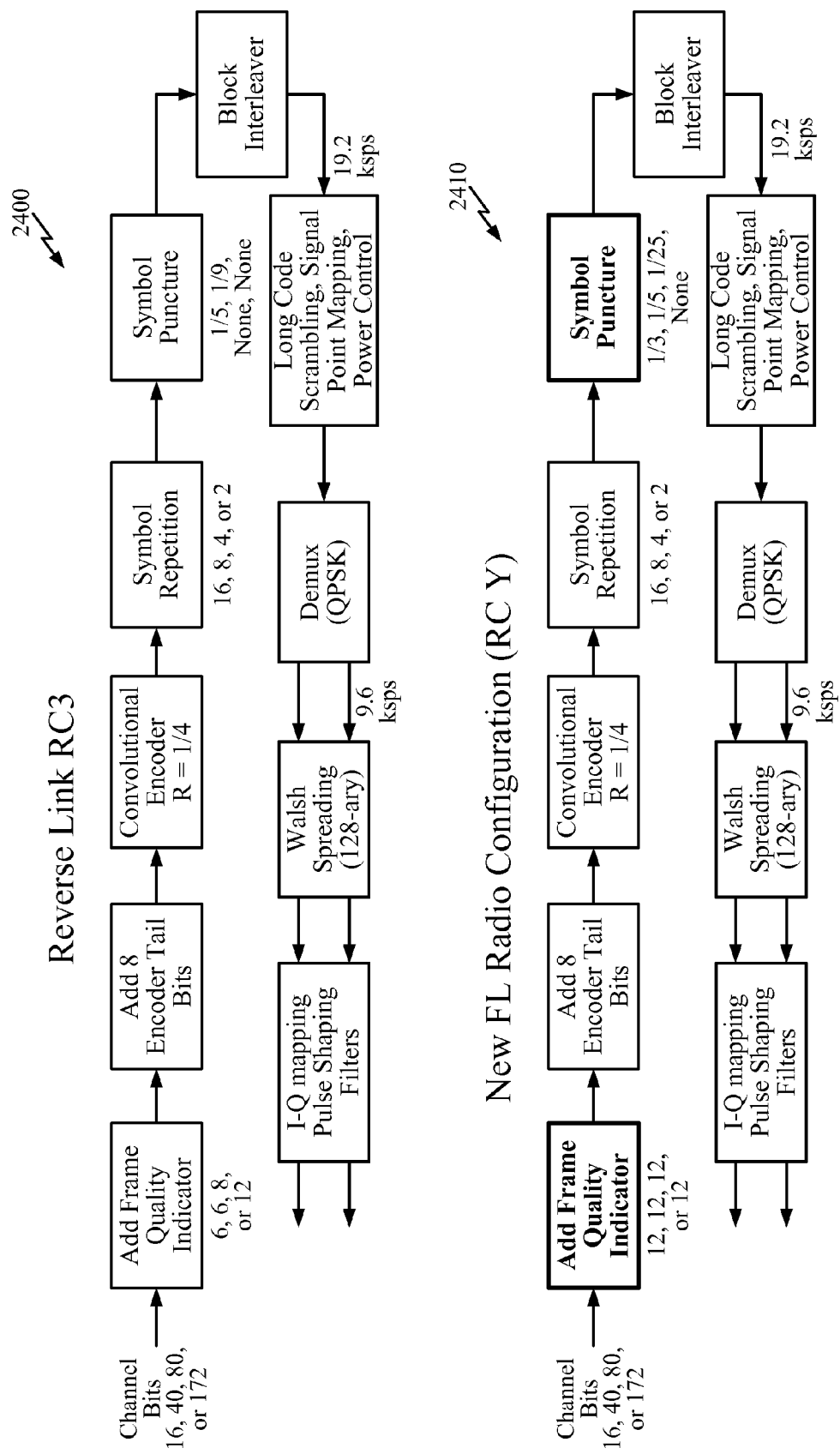
FIG. 24 illustrates an implementation of a prior art reverse link symbol path, as well as an exemplary embodiment of a reverse link symbol path according to the present disclosure.

FIG. 24 illustrates an implementation 2400 of a prior art reverse link symbol path, as well as an exemplary embodiment 2410 of a reverse link symbol path according to the present disclosure. In the implementation 2400, CRC's of length 6, 6, 8, or 12 are appended to the bits of a frame, depending on the frame symbol rate. In the exemplary embodiment 2410 according to the present disclosure, CRC's of increased length 12, 12, 12, or 12 may be appended to the bits of a frame. As in the case of the forward link processing illustrated in FIG. 21, the use of increased-length CRC's improves the performance of the early decoding schemes according to the present disclosure, allowing, e.g., more accurate detection of decoding success for the early decoding techniques. Note the specific CRC lengths illustrated herein are provided for illustrative purposes only, and are not meant to limit the scope of the present disclosure to any particular CRC lengths illustrated.

As further shown in the implementation 2400, the symbol puncture rates are 1/5, 1/9, None, and None, depending on the frame symbol rate. In the exemplary embodiment 2410 according to the present disclosure, the symbol puncture rates are 1/3, 1/5, 1/25, and None, depending on the frame symbol rate. One of ordinary skill in the art will appreciate that the increased use of puncturing in the exemplary embodiment 2410 may accommodate the increased length CRC's that are also present in the exemplary embodiment 2410.

In an exemplary embodiment, the ACK signal sent by the BS to the MS may be provided by supplanting (puncturing) a bit having a predetermined position on a forward link traffic channel, and using on-off keying (OOK) at the predetermined position to signal an ACK or NAK (no acknowledgment) to the MS. In an exemplary embodiment, the ACK bit may be time domain multiplexed (TDM'ed) with a reverse link power control bit.

Note the frame early termination aspects described above may be applied not only to a fundamental channel of a cdma2000 communications link, but also to a "high data rate" supplemental channel. In an alternative exemplary embodiment (not shown), an ACK signaling mechanism on the reverse link may be provided to control transmissions on both a forward fundamental channel and one or more forward supplemental channels, for systems operating according to the cdma2000 standard.

Figure 25:
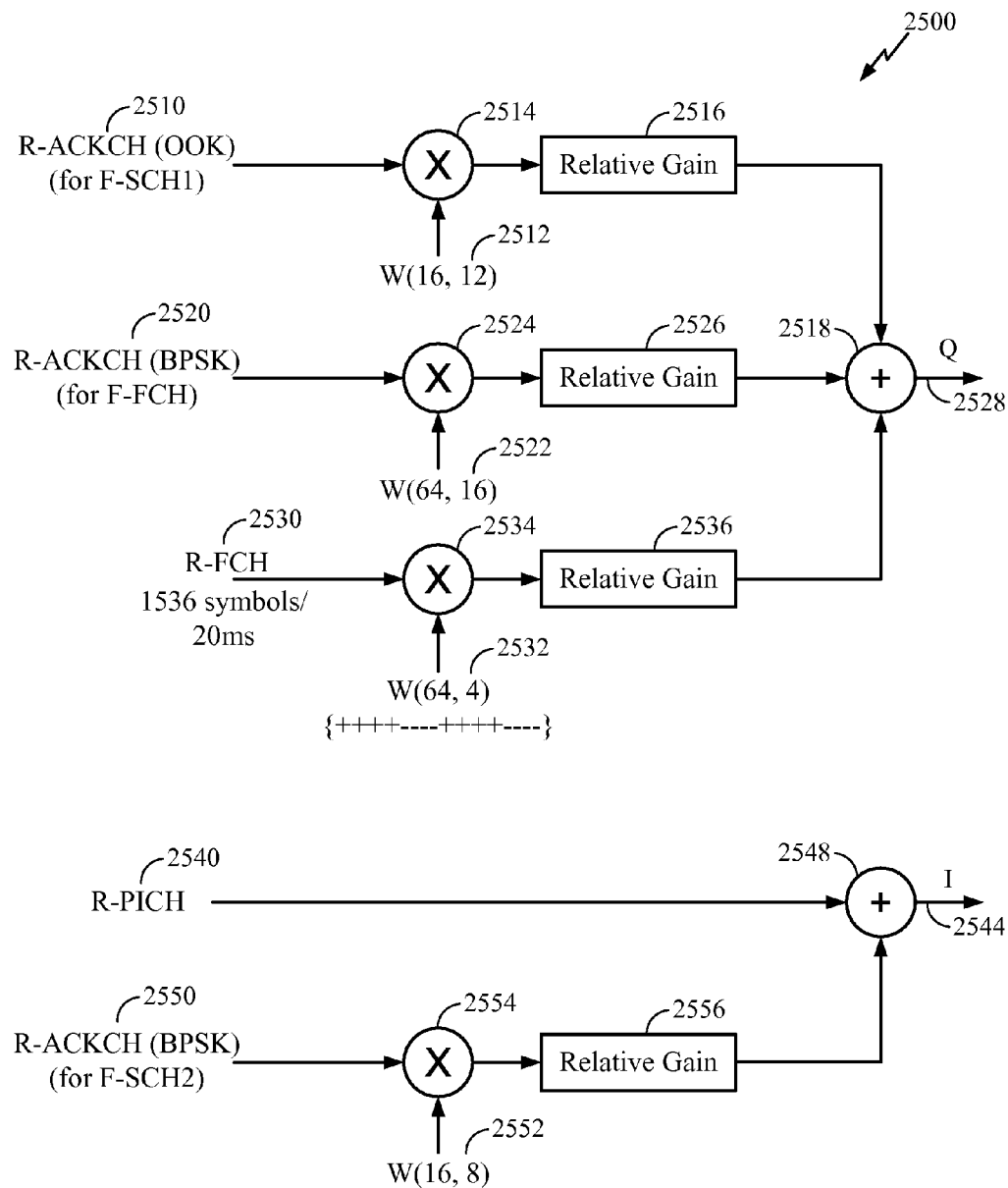
FIG. 25 illustrates an exemplary embodiment of a signaling scheme used to signal the ACK message on the reverse link for early termination of a forward fundamental channel (F-FCH) and/or up to two forward supplemental channels (F-SCH1 and F-SCH2).

FIG. 25 illustrates an exemplary embodiment of a signaling scheme 2500 used to signal the ACK message on the reverse link for early termination of a forward fundamental channel (F-FCH) and/or up to two forward supplemental channels (F-SCH1 and F-SCH2).

In FIG. 25, a reverse ACK channel (R-ACKCH) 2520 is modulated using binary phase shift keying (BPSK) onto a Walsh code W(64, 16) 2522 using modulator 2524. In an exemplary embodiment, the R-ACKCH 2520 may signal the BS to terminate transmissions on a forward fundamental channel (F-FCH). A relative channel gain 2526 is applied to the resultant signal, and provided to the additive combiner 2518.

In FIG. 25, a second reverse ACK channel (R-ACKCH) 2510 is modulated using binary phase shift keying (BPSK) onto a Walsh code W(16, 12) 2512 using modulator 2514. In an exemplary embodiment, the ACKCH 2510 may signal the BS to terminate transmissions on a first forward supplemental channel (F-SCH1). A relative channel gain 2516 is applied to the resultant signal, and provided to the additive combiner 2518.

As further shown in FIG. 25, both the R-ACK channels may be combined with a reverse fundamental channel (R-FCH) onto the quadrature (Q) component of the RL signal. The R-FCH may have a rate of 1536 symbols per 20 ms, and is also modulated onto a Walsh code W(16,4) 2532 using a modulator 2534. A relative channel gain 2536 is applied to the resultant signal, and provided to the additive combiner 2518. The output of the additive combiner may be provided on a quadrature (Q) channel 2528 for reverse link transmission to the BS.

As further shown in FIG. 25, a third reverse ACK channel (R-ACKCH) 2550 is modulated using on-off keying (OOK) onto a Walsh code W(16, 8) 2552 using modulator 2554. In an exemplary embodiment, the ACKCH 2550 may signal the BS to terminate transmissions on a second forward supplemental channel (F-SCH2). A relative channel gain 2556 is applied to the resultant signal, and provided to the additive combiner 2548. R-ACKCH 2550 may be combined with a reverse pilot channel (R-PICH) 2540 using adder 2548 to generate the in-phase (I) reverse link signal 2544.

One of ordinary skill in the art will appreciate that the above illustrations of specific ACK signaling schemes for the forward and reverse channels are given for illustrative purposes only, and are not meant to limit the scope of the present disclosure to any particular ACK signaling schemes for the forward and reverse channels. For example, for a Forward Supplemental Channel (F-SCH) wherein power control bit positions are unavailable for power control, a common ACK channel (CACKCH) may instead be used. ACK channel bit positions in the CACKCH may be separately assigned for each user, and such bit positions may be indicated via external signaling (not shown). Such exemplary embodiments are contemplated to be within the scope of the present disclosure.

Figure 26:
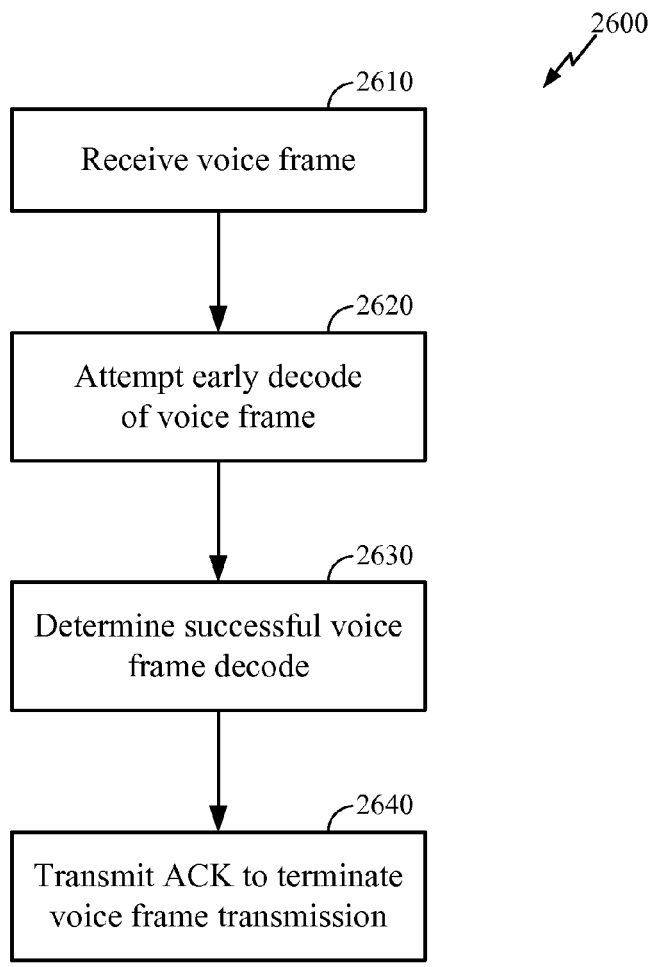
FIG. 26 illustrates an exemplary embodiment of a method according to the present disclosure.

FIG. 26 illustrates an exemplary embodiment of a method 2600 according to the present disclosure. Note the method 2600 is shown for illustrative purposes only, and is not meant to restrict the scope of the present disclosure to any particular method.

At step 2610, a voice frame is received.

At step 2620, the method attempts early decoding of the voice frame received. In an exemplary embodiment, the early decoding may be attempted prior to all sub-segments of the frame being received.

At step 2630, the method determines whether the attempted voice frame decoding has been successful. In an exemplary embodiment, a frame quality indicator such as a CRC may be checked to determine whether frame decoding has been successful.

At step 2640, an acknowledgment signal (ACK) is transmitted to terminate voice frame transmission.

According to one aspect, a method of controlling a wireless communication device comprises receiving an acknowledgement message from an access point, wherein the acknowledgement message is received in a symbol position of a power control bit. The method also comprises stopping transmission responsive to the acknowledgement message. According to another aspect, a method of controlling a wireless communication device comprises receiving an acknowledgement message from an access terminal, wherein the acknowledgement message is received in a symbol position of a power control bit. The method also comprises stopping transmission responsive to the acknowledgement message. According to yet another aspect, a method of controlling a wireless communication device comprises transmitting an acknowledgement message to terminate transmission of a frame on a forward link responsive to successfully decoding the frame. According to yet another aspect, a wireless communication apparatus comprises means for performing any of these steps. The wireless communication apparatus may comprises a processor configured to perform any of the functions of any of these steps. If desired, a computer readable medium may comprise computer program instructions including instructions for performing any of these steps.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. A method of controlling a wireless communication device, the method comprising:
   receiving an acknowledgement message from an access point that a frame has been successfully decoded prior to completed transmission of all power control bits allocated for the frame, wherein the acknowledgement message is received in a symbol position of a received power control bit;
   stopping transmission of the frame responsive to the acknowledgement message;
   gating a pilot signal, responsive to the acknowledgement message, for select power control groups according to a gated pilot pattern that is used to signal transmission of a null rate frame.

2. The method of claim 1, wherein the acknowledgement message can be received from any cell in an active set.

3. The method of claim 2, wherein the wireless communication device comprises an access terminal.

4. The method of claim 1, wherein the wireless communication device comprises an access terminal.

5. A method of controlling a wireless communication device, the method comprising:
   receiving an acknowledgement message from an access terminal that a frame has been successfully decoded prior to completed transmission of all power control bits allocated for the frame, wherein the acknowledgement message is received in a symbol position of a received power control bit;
   stopping transmission of the frame responsive to the acknowledgement message; and
   gating a pilot signal, responsive to the acknowledgement message, for select power control groups according to a gated pilot pattern that is used to signal transmission of a null rate frame.

6. The method of claim 5, wherein the wireless communication device comprises an access point.

7. A method of controlling a wireless communication device, the method comprising:
   decoding each of a plurality of power control bits as received;
   transmitting an acknowledgement message to terminate transmission of a frame on a forward link responsive to successfully decoding the frame, wherein the transmitting is prior to receiving all of the plurality of power control bits allocated for the frame; and
   restricting the transmitting according to an acknowledgement transmission mask, the acknowledgement transmission mask allowing transmission after a threshold number of the plurality of power control bits has been received.

8. The method of claim 7, wherein the wireless communication device comprises an access point.

9. The method of claim 7, wherein the wireless communication device comprises an access terminal.

10. A wireless communication device, comprising:
    means for receiving an acknowledgement message from an access point that a frame has been successfully decoded prior to completed transmission of all power control bits allocated for the frame, wherein the acknowledgement message is received in a symbol position of a received power control bit;
    means for stopping transmission of the frame responsive to the acknowledgement message; and
    means for gating a pilot signal, responsive to the acknowledgement message, for select power control groups according to a gated pilot pattern that is used to signal transmission of a null rate frame.

11. The wireless communication device of claim 10, wherein the acknowledgement message can be received from any cell in an active set.

12. The wireless communication device of claim 11, wherein the wireless communication device comprises an access terminal.

13. The wireless communication device of claim 10, wherein the wireless communication device comprises an access terminal.

14. A wireless communication device, comprising:
    means for receiving an acknowledgement message from an access terminal that a frame has been successfully decoded prior to completed transmission of all power control bits allocated for the frame, wherein the acknowledgement message is received in a symbol position of a received power control bit;
    means for stopping transmission of the frame responsive to the acknowledgement message; and
    means for gating a pilot signal, responsive to the acknowledgement message, for select power control groups according to a gated pilot pattern that is used to signal transmission of a null rate frame.

15. The wireless communication device of claim 14, wherein the wireless communication device comprises an access point.

16. A wireless communication device, comprising:
    means for decoding each of a plurality of power control bits as received;
    means for transmitting an acknowledgement message to terminate transmission of a frame on a forward link responsive to successfully decoding the frame, wherein the transmitting is prior to receiving all of the plurality of power control bits allocated for the frame; and
    means for restricting the transmitting according to an acknowledgement transmission mask, the acknowledgement transmission mask allowing transmission after a threshold number of the plurality of power control bits has been received.

17. The wireless communication device of claim 16, wherein the wireless communication device comprises an access point.

18. The wireless communication device of claim 16, wherein the wireless communication device comprises an access terminal.

19. A computer program product, comprising:
    a non-transitory computer-readable medium having program code recorded thereon, the program code comprising:
      program code to receive an acknowledgement message from an access point that a frame has been successfully decoded prior to completed transmission of all power control bits allocated for the frame, wherein the acknowledgement message is received in a symbol position of a received power control bit;
      program code to stop transmission of the frame responsive to the acknowledgement message; and
      program code to gate a pilot signal, responsive to the acknowledgement message, for select power control groups according to a gated pilot pattern that is used to signal transmission of a null rate frame.

20. The computer program product of claim 19, wherein the acknowledgement message can be received from any cell in an active set.

21. The computer program product of claim 20, wherein the wireless communication device comprises an access terminal.

22. The computer program product of claim 19, wherein the wireless communication device comprises an access terminal.

23. A computer program product, comprising:
a non-transitory computer-readable medium having program code recorded thereon, the program code comprising:
program code to receive an acknowledgement message from an access terminal that a frame has been successfully decoded prior to completed transmission of all power control bits allocated for the frame, wherein the acknowledgement message is received in a symbol position of a received power control bit;
program code to stop transmission of the frame responsive to the acknowledgement message; and
program code to gate a pilot signal, responsive to the acknowledgement message, for select power control groups according to a gated pilot pattern that is used to signal transmission of a null rate frame.

24. The computer program product of claim 23, wherein the wireless communication device comprises an access point.

25. A computer program product, comprising:
a non-transitory computer-readable medium having program code recorded thereon, the program code comprising:
program code to decode each of a plurality of power control bits as received;
program code to transmit an acknowledgement message to terminate transmission of a frame on a forward link responsive to successfully decoding the frame, wherein the program code to transmit is executed prior to receiving all of the plurality of power control bits allocated for the frame; and
program code to restrict execution of the program code to transmit according to an acknowledgement transmission mask, the acknowledgement transmission mask allowing transmission after a threshold number of the plurality of power control bits has been received.

26. The computer program product of claim 25, wherein the wireless communication device comprises an access point.

27. The computer program product of claim 25, wherein the wireless communication device comprises an access terminal.

28. A wireless communication apparatus, comprising:
at least one processor; and
a memory coupled to the at least one processor,
wherein the at least one processor is configured to:
receive an acknowledgement message from an access point that a frame has been successfully decoded prior to completed transmission of all power control bits allocated for the frame, wherein the acknowledgement message is received in a symbol position of a received power control bit;
stop transmission of the frame responsive to the acknowledgement message; and
gate a pilot signal, responsive to the acknowledgement message, for select power control groups according to a gated pilot pattern that is used to signal transmission of a null rate frame.

29. The wireless communication apparatus of claim 28, wherein the acknowledgement message can be received from any cell in an active set.

30. The wireless communication apparatus of claim 29, wherein the wireless communication device comprises an access terminal.

31. The wireless communication apparatus of claim 28, wherein the wireless communication device comprises an access terminal.

32. A wireless communication apparatus, comprising:
at least one processor; and
a memory coupled to the at least one processor,
wherein the at least one processor is configured to:
receive an acknowledgement message from an access terminal that a frame has been successfully decoded prior to completed transmission of all power control bits allocated for the frame, wherein the acknowledgement message is received in a symbol position of a received power control bit;
stop transmission of the frame responsive to the acknowledgement message; and
gate a pilot signal, responsive to the acknowledgement message, for select power control groups according to a gated pilot pattern that is used to signal transmission of a null rate frame.

33. The wireless communication apparatus of claim 32, wherein the wireless communication device comprises an access point.

34. A wireless communication apparatus, comprising:
at least one processor; and
a memory coupled to the at least one processor,
wherein the at least one processor is configured to:
decode each of a plurality of power control bits as received;
transmit an acknowledgement message to terminate transmission of a frame on a forward link responsive to successfully decoding the frame, wherein the at least one processor is configured to transmit prior to receiving all of the plurality of power control bits allocated for the frame; and
wherein the at least one processor is further configured to restrict execution of the program code to transmit according to an acknowledgement transmission mask, the acknowledgement transmission mask allowing transmission after a threshold number of the plurality of power control bits has been received.

35. The wireless communication apparatus of claim 34, wherein the wireless communication device comprises an access point.

36. The wireless communication apparatus of claim 34, wherein the wireless communication device comprises an access terminal.

* * * * *